US010078547B2

(12) United States Patent
Wong et al.

(10) Patent No.: US 10,078,547 B2
(45) Date of Patent: Sep. 18, 2018

(54) PREDICTIVE CACHING FOR CHECK WORD SNOOPING IN HIGH PERFORMANCE FICON

(71) Applicant: INTERNATIONAL BUSINESS MACHINES CORPORATION, Armonk, NY (US)

(72) Inventors: Raymond Wong, Hopewell Junction, NY (US); Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/275,651

(22) Filed: Sep. 26, 2016

(65) Prior Publication Data

US 2018/0089023 A1    Mar. 29, 2018

(51) Int. Cl.
*H03M 13/00* (2006.01)
*G06F 11/10* (2006.01)
*G06F 12/0862* (2016.01)

(52) U.S. Cl.
CPC ...... *G06F 11/1064* (2013.01); *G06F 11/1004* (2013.01); *G06F 12/0862* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 6,772,289 B1 | 8/2004 | Corrigan | |
| 7,281,066 B2 | 10/2007 | Rader et al. | |
| 8,560,767 B2 | 10/2013 | Bronson et al. | |
| 9,136,987 B2 | 9/2015 | Hodges et al. | |
| 9,318,171 B2 | 4/2016 | Van Huben et al. | |
| 2011/0239070 A1* | 9/2011 | Morrison | G06F 11/2236 714/731 |
| 2012/0311390 A1* | 12/2012 | Bubb | G06F 13/387 714/48 |
| 2013/0047042 A1* | 2/2013 | Bubb | G06F 13/387 714/48 |
| 2013/0145085 A1* | 6/2013 | Yu | G06F 12/0246 711/103 |

* cited by examiner

*Primary Examiner* — Daniel McMahon
(74) *Attorney, Agent, or Firm* — Cantor Colburn LLP; Steven Chiu

(57) ABSTRACT

Technical solutions are described for computing data check word for a host request for an I/O processing operation at a host computer system that communicates with a control unit. An example method includes obtaining information for a first I/O operation at a channel subsystem in the host computer system, and accessing an address control word (ACW) of the first I/O operation. The ACW is stored in the local channel memory, and the ACW includes a first data check seed-value. The method also includes computing a first data check word based on the first data check seed-value from the ACW. The method also includes obtaining information for a second I/O operation at the channel subsystem, and in response to the second i/o operation corresponding to said ACW of the first I/O operation, computing a second data check word based on a second data check seed-value from a cache memory.

20 Claims, 12 Drawing Sheets

| Row | 01234567 | 01234567 | 01234567 | 01234567 | 01234567 | 01234567 | 01234567 | 01234567 |
|---|---|---|---|---|---|---|---|---|
| | BYTE 0 | BYTE 1 | BYTE 2 | BYTE 3 | BYTE 4 | BYTE 5 | BYTE 6 | BYTE 7 |
| 1 | 00000000 | 00000000 | 00000000 | | | | | |
| 2 | | | CTL | 40 BIT ADDRESS for Local Channel Memory | | | | |
| 3 | ACW INDEX | | | VALIDATION FIELD | | | 16 Meg Byte Offset | |

Figure 3 - Data Router PCIe Address mapping

FIG. 4

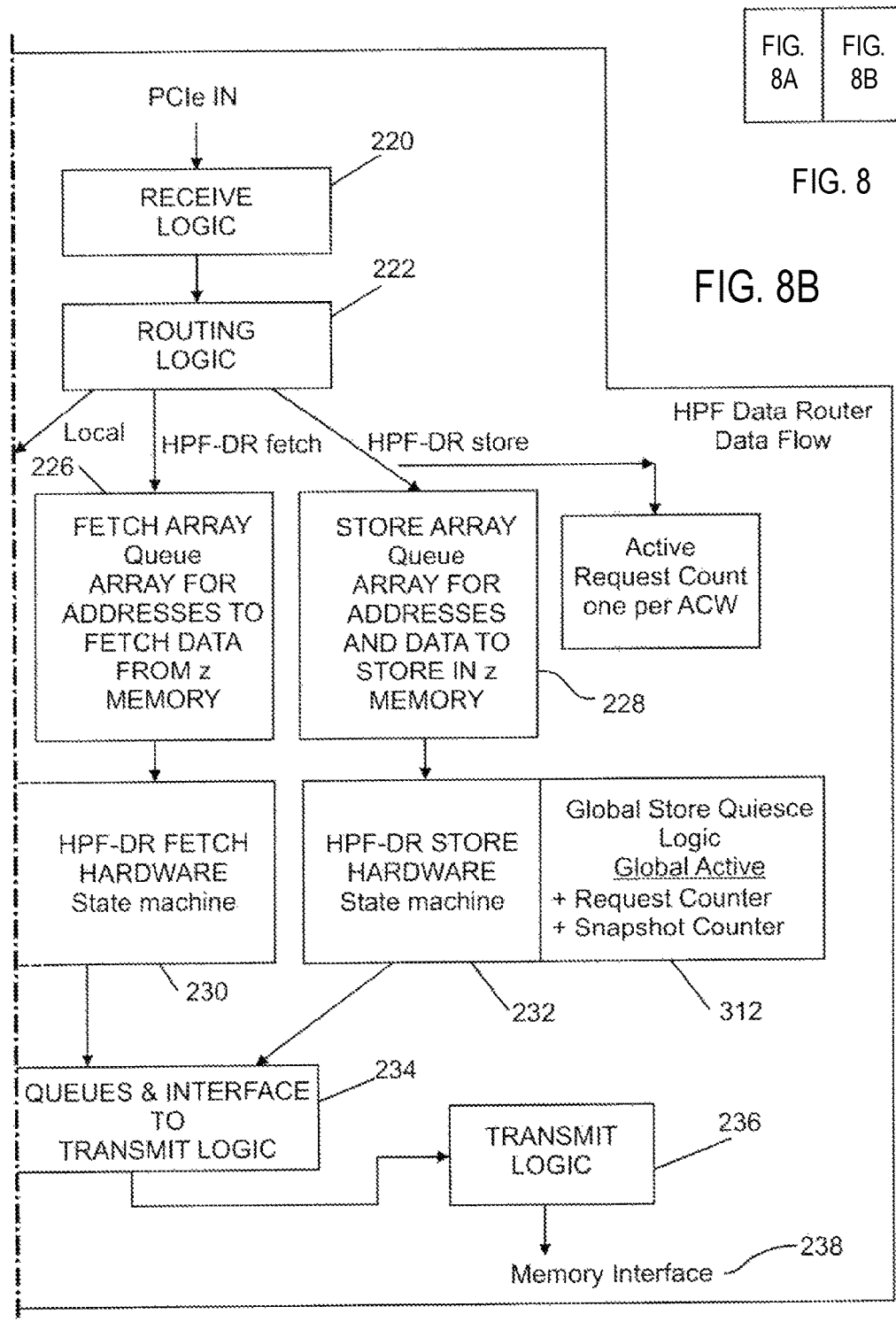

PREDICTIVE CACHING FOR CHECK WORD SNOOPING IN HIGH PERFORMANCE FICON

BACKGROUND

The present application relates to computer systems, and more specifically, to improving the performance of input/output (I/O) interface for computers.

Input/output (I/O) operations are used to transfer data between a host computer system memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

The channel subsystem and I/O device may operate in a transport mode that supports the transfer of one or more command control blocks to transfer data between the I/O devices and memory. A transport control word (TCW) specifies one or more I/O commands to be executed. For commands initiating certain I/O operations, the TCW designates memory areas associated with the operation, the action to be taken whenever a transfer to or from the area is completed, and other options.

Generally, the host computer system and the channel subsystem are connected to I/O devices over a link via a host bus adaptor (HBA). The HBA is coupled to a channel, which includes hardware including a channel microprocessor and local channel memory that appears as the host system to the HBA. The channel hardware isolates the HBA from the host computer and its memory spaces.

SUMMARY

According to one or more embodiments, a computer implemented method for computing data check word for a host request for performing an input/output (I/O) processing operation at a host computer system configured for communication with a control unit includes obtaining information relating to a first I/O operation at a channel subsystem in the host computer system, the channel subsystem including at least one channel having a channel processor and a local channel memory. The computer implemented method also includes accessing an address control word (ACW) corresponding to the first I/O operation, the ACW specifying one or more host memory locations for transfer of data between the host computer system and the control unit. The ACW is stored in the local channel memory, and the ACW includes a first data check seed-value. The computer implemented method also includes computing a first data check word based on the first data check seed-value from the ACW. The computer implemented method also includes obtaining information relating to a second i/o operation at the channel subsystem. The computer implemented method also includes in response to the second i/o operation corresponding to said ACW that is corresponding to the first I/O operation, computing a second data check word based on a second data check seed-value from a cache memory.

Described herein are one or more embodiments of a system for computing data check word for a host request for performing an input/output (I/O) processing operation at a host computer system configured for communication with a control unit. The system includes a memory; a cache memory that has lower latency than the memory; a timer; and a data router hardware coupled to the memory, the cache memory, and the timer. The data router obtains information relating to a first I/O operation at a channel subsystem in the host computer system, the channel subsystem including at least one channel having a channel processor and a local channel memory. The data router also accesses an address control word (ACW) corresponding to the first I/O operation, the ACW specifying one or more host memory locations for transfer of data between the host computer system and the control unit, the ACW being stored in the local channel memory, the ACW including a first data check seed-value. The data router also computes a first data check word based on the first data check seed-value from the ACW. The data router also obtains information relating to a second I/O operation at the channel subsystem. The data router, in response to the second I/O operation corresponding to said ACW that is corresponding to the first I/O operation, computes a second data check word based on a second data check seed-value from a cache memory.

According to one or more embodiments, a computer program product for a host request for performing an input/output (I/O) processing operation at a host computer system configured for communication with a control unit, includes a computer readable storage medium. The computer readable storage medium includes computer executable instructions to perform a method. The method includes obtaining information relating to a first I/O operation at a channel subsystem in the host computer system, the channel subsystem including at least one channel having a channel processor and a local channel memory. The method also includes accessing an address control word (ACW) corresponding to the first I/O operation, the ACW specifying one or more host memory locations for transfer of data between the host computer system and the control unit, the ACW being stored in the local channel memory, the ACW including a first data check seed-value. The method also includes computing a first data check word based on the first data check seed-value from the ACW. The computer program product also includes obtaining information relating to a second I/O operation at the channel subsystem. The method also includes, in response to the second I/O operation corresponding to said ACW that is corresponding to the first I/O operation, computing a second data check word based on a second data check seed-value from a cache memory.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 4 depicts embodiments of an address field for an address control structure;

FIG. 8B is a block diagram depicting part 2 of the data flow through logical components of a data router;

DETAILED DESCRIPTION

In accordance with an aspect of the present invention, input/output (I/O) processing is facilitated. In one or more examples, a data router transmits data to a host computer via commands through a data assist engine (DA). A host command can be larger (for example 2 k bytes) than a command-stream size (for example 256 bytes) of the host computer. The DA splits the host command into smaller chunks to match the dimensions of the host computer command-stream, in the above example 256-byte chunks. The data router computes a cyclic redundancy check (CRC) of the data that passes through the data router. Typically, the CRC seed is stored in a memory in the data router, and has to be kept up to date after each transaction. Thus, in the above example, after every 256-byte chunk of data, the data flow incurs a penalty of a memory read/write access, leading to inefficiencies and slow speed. The technical solutions described herein address such technical problems, and as such provide an improvement to computing technology, by increasing efficiency and leading to faster working of a computer system, specifically I/O processing.

In one or more examples, the technical solutions incorporate a timer and a CRC cache in the data router for processing commands that belong to the same Access Control Word (ACW), thus reducing the memory access penalty. The use of the CRC cache reduces the memory read/write access penalty and the timer keeps the CRC seed in the memory up to date periodically, instead of after every 256-byte transaction in the above example.

Figure 1:
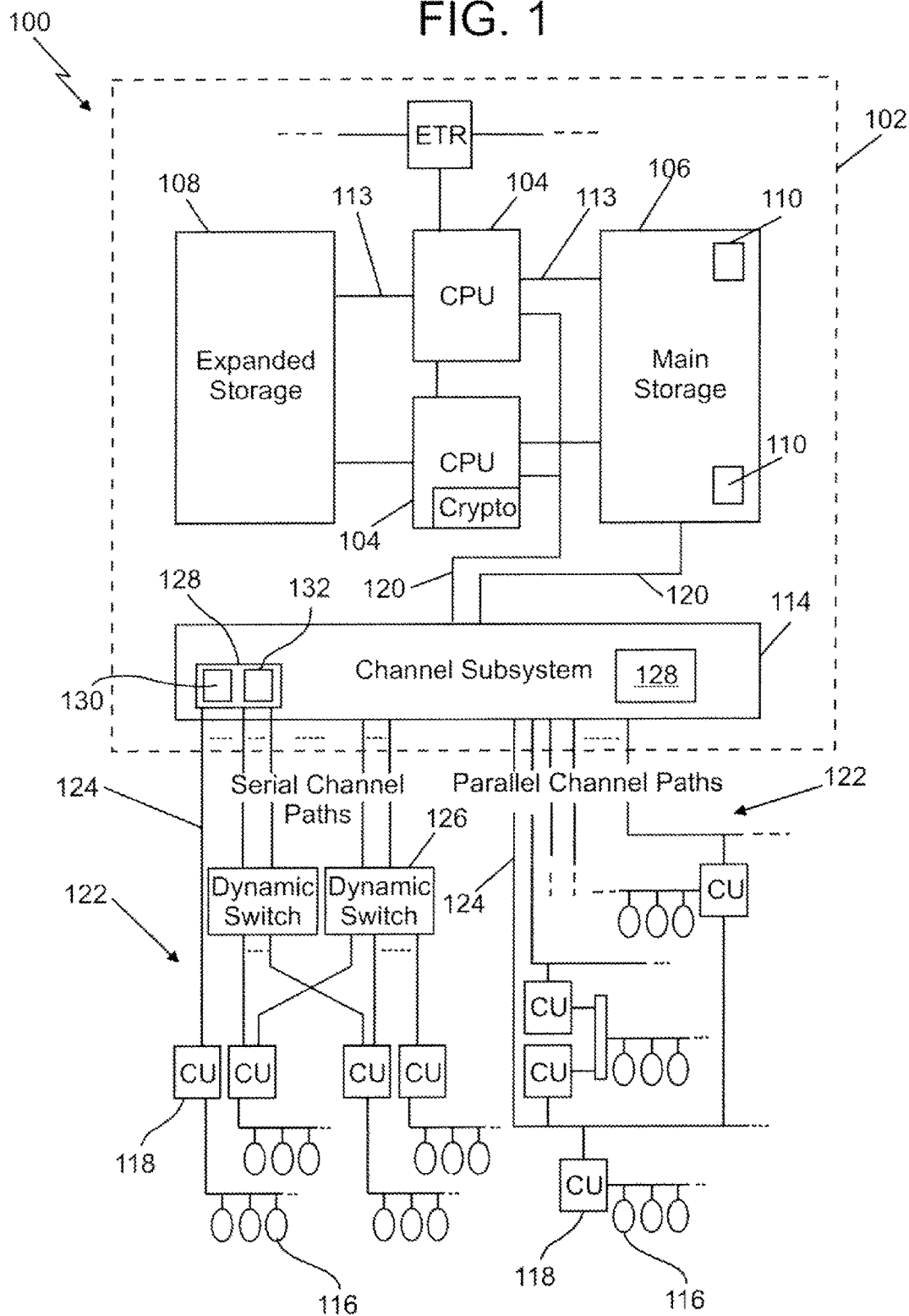
FIG. 1 depicts one embodiment of an I/O processing system incorporating and using one or more aspects of the present description.

FIG. 1 illustrates an exemplary embodiment of an I/O processing system 100 that includes a host computer system 102 that includes a data storage and/or processing system such as a zSeries™ mainframe computer by International Business Machines Corporation (IBM™). IBM is a registered trademark of International Business Machines Corporation, Armonk, N.Y., USA. Other names used herein may be registered trademarks, trademarks or product names of International Business Machines Corporation or other companies. The host computer system 102 includes various processing, storage and communication elements. In one embodiment, the host computer system 102 includes one or more central processing units (CPUs) 104, memory components (e.g., zSeries memory) such as a main storage or memory 106 and/or an expanded storage or memory 108 (collectively referred to as the "host memory"). The system 102 also includes, one or more operating systems (OSs) 110 that are executed by one or more of the CPUs 104. For example, one CPU 104 can execute a Linux® operating system 110 and/or a z/OS™ operating system 110 as different virtual machine instances. CPU 104 is the controlling center of the I/O processing system 100. The CPU 104 contains sequencing and processing facilities for instruction execution, interruption action, timing functions, initial program loading, and other machine-related functions. The CPU 104 is coupled to the main memory 106 and/or expanded memory 108 via a connection 113, such as a bidirectional or unidirectional bus.

The host computer system 102 also includes a channel subsystem 114 that provides a communication interface between the host computer system 102 and various I/O devices 116, which may be controlled by one or more control units 118. I/O devices include equipment such as printers, magnetic-tape units, direct-access-storage devices, displays, keyboards, communications controllers, teleprocessing devices, and sensor-based equipment. The channel subsystem 114 directs the flow of information between the I/O devices 116 and the host computer system 102. The channel subsystem 114 relieves the CPUs 104 of the task of communicating directly with the I/O devices 116 and permits data processing to proceed concurrently with I/O processing. The channel subsystem 114 is coupled to the CPUs 104, the main memory 106 and/or the expanded memory 108 via a connection 120, such as a bus.

In one or more examples, the channel subsystem 114 is connected to each I/O device 116 via a respective "channel path" 122 that connects the channel subsystem 114 to each control unit 118 via a connection 124 such as a serial or parallel link. Control units 118 may be attached to the channel subsystem 114 via more than one channel path 122, and an I/O device 116 may be attached to more than one control unit 118. In all, an individual I/O device 116 may be accessible by multiple channel paths. A channel path can use various types of connections, such as a parallel interface, a serial-I/O interface and a FICON I/O interface. For example, a serial channel path may include one or more optical fibers connected to a control unit 118 via, e.g., a dynamic switch 126 in a Fibre channel fabric, and a parallel interface may include a number of electrical conductors. The FICON I/O interface is described in the ANSI standards document "Fibre Channel-Single-Byte Command Code Sets Mapping Protocol-4 (FC-SB-4)," T11 Project 2122-D, Revision 3.00, Sep. 22, 2000, which is incorporated herein by reference in its entirety.

In one or more examples, the channel subsystem 114 includes one or more individual channels 128 that are each connected to one or more control units 118 and/or I/O devices 116 via one or more channel paths 122. Each channel 128 includes processing electronics such as a local channel microprocessor 130 and a local channel memory 132 that is connected to and accessible by the local channel microprocessor 130. The local channel memory 132 may include information such as a channel-program designation, a channel-path identifier, a device number, a device count, status indications, as well as information on path availability and functions pending or being performed.

Also located within each channel 128 are one or more subchannels. Each subchannel is a data structure located within a channel memory 132 that provides information concerning an associated I/O device 116 and its attachment to the channel subsystem 114. The subchannel also provides information concerning I/O operations and other functions involving the associated I/O device 116. The subchannel facilitates the channel subsystem 114 to provide information about associated I/O devices 116 to the CPUs 104. Channels 128 that are connected to multiple control units 118 or multiple I/O devices 116 may have multiple subchannels, each dedicated to a single I/O device 116. In one embodiment, the number of subchannels provided by the channel subsystem is independent of the number of channel paths 122 to the associated I/O devices 116. For example, a device 116 that is accessible through alternate channel paths 122 still is represented by a single subchannel.

Each control unit 118 provides logic to operate and control one or more I/O devices 116 and adapts, through the use of common facilities, the characteristics of each I/O device 116 to the link interface provided by a channel 128. The common facilities provide for the execution of I/O operations, indications concerning the status of I/O devices 116 and the control unit 118, control of the timing of data transfers over a channel path 122 and certain levels of I/O device control. A control unit 118 may be housed separately, or may be physically and logically integrated with an I/O device, the channel subsystem, or a CPU.

I/O operations are described as any operation that involves the transfer of data between the host computer system 102 and I/O devices 116. As described herein, an I/O operation includes the communications between the channel subsystem 114 and a device 116 (via, in one embodiment, a control unit 118) in which a single command (e.g., a channel command word or CCW), a single command message including multiple commands (e.g., a transport command information unit transporting a Transport Command Control block (TCCB)), or multiple chained commands (e.g., multiple CCWs) are sent from the channel subsystem 114 to a device. The I/O operation may also include one or more response messages generated by the device 116 or an associated control unit 118 in response to receiving and/or executing the command or chained commands.

In one embodiment, I/O operations are initiated with a device 116 by the execution of I/O instructions generated by an OS 110 that designate the subchannel associated with the device 116. Such instructions are executed in the host system by a CPU 104 by sending parameters to the channel subchannel that requests that the channel subsystem 114 perform various functions in an I/O operation through some channel 128.

For example, the CPU 104 executes a "START SUBCHANNEL" instruction by passing parameters to the target subchannel requesting that the channel subsystem 114 perform a start function with the I/O device 116 associated with the subchannel. The channel subsystem 114 performs the start function by using information at the subchannel, including the information passed during the execution of the START SUBCHANNEL instruction, to find an accessible channel path to the device 116, and to execute the I/O operation once a channel path has been selected.

When an instruction such as a START SUBCHANNEL instruction is executed by the CPU 104, a channel 128 commences performing the I/O operation. In one or more examples, the channel subsystem 114 operates under Fibre Channel protocol such as a High Performance FICON (HPF) for communication between the channel subsystem 114 and the devices 116 and/or control units 118. FICON and HPF and its phases are described further in "Fibre Channel: Single-Byte Command Code Sets Mapping Protocol-4 (FC-SB-4)," T11 Project 2122-D, Revision 3.00, Sep. 22, 2000, which is hereby incorporated herein by reference in its entirety.

In one embodiment, execution of the START SUBCHANNEL instruction passes the contents of an operation request block (ORB) to the channel subsystem 114. The ORB specifies a channel program that includes an address of one or more command words (e.g., a channel command word or a transport command word described further below). There are two modes of subchannel operation. In one embodiment, the host computer system 102 operates in a command mode and specifies command word(s) in the form of a channel command word (CCW). In another embodiment, the host system operates in a transport mode and specifies command word(s) in the form of a transport command word (TCW).

A subchannel may enter a transport mode when an FCX (Fibre Channel Extensions) facility is installed and the start function is set at the subchannel as the result of the execution of a START SUBCHANNEL instruction that specifies a TCW channel program. The subchannel remains in transport mode until the start function is reset at the subchannel. At all other times, the subchannel is in command mode.

In command mode, the channel executes a CCW channel program that includes a single channel-command word or a sequence of channel-command words executed sequentially that control a specific sequence of channel operations. A control unit executes a CCW I/O operation by decoding, accepting, and executing CCW commands by an I/O device. One or more CCWs arranged for sequential execution form a CCW channel program and are executed as one or more I/O operations, respectively.

In one or more examples, the fibre-channel-extensions (FCX) facility provides for the formation of a transport mode channel program that is composed of a transport control word (TCW) that designates a transport-command-control block (TCCB) and a transport-status block (TSB). The TCCB includes a transport-command area (TCA) which contains a list of one or more (e.g., up to 30) I/O commands that are in the form of device-command words (DCWs). A TCW and its TCCB may specify either a read or a write operation. In one or more examples, a FCX-bidirectional-data-transfer facility may be installed in a system that supports transport mode operations, that allows the host computer system 102 to specify the transfer of both input and output data in a single transport mode I/O operation if the connected device 116 and control unit 118 supports bidirectional-data transfer. When a control unit 118 recognizes bi-directional data transfers, a TCW and its TCCB, depending on the device, may specify both, read and write data transfers.

In the transport mode, a single transport command word (TCW) specifies a location in memory of a TCCB (as well as a location in memory 106 of one or more data areas) that is sent in a single message instead of separate individual CCWs in the command mode. A control unit 118 executes a transport mode I/O operation by decoding, accepting, and executing a TCCB and the individual DCWs included therein. If the ORB specifies a TCW channel program, the channel subsystem 114 uses information in the designated TCW to transfer the TCCB to a control unit 118. The contents of the TCCB are ignored by the channel subsystem 114 after the TCCB is transferred to the control unit 118 and only have meaning to the control unit 118 and the associated I/O device 116.

In one or more examples, the control unit 118 generates a response message in response to executing the channel program. The control unit 118 may also generate a response message without executing the channel program under a limited number of communication scenarios, e.g., to inform the channel subsystem 114 that the channel program will not be executed. The control unit 118 may include a number of elements to support communication between the I/O communications adapter and I/O devices, as well as in support of channel program execution. For example, the control unit 118 can include control logic to parse and process messages, in addition to one or more queues, timers, and registers to facilitate communication and status monitoring.

Figure 2:
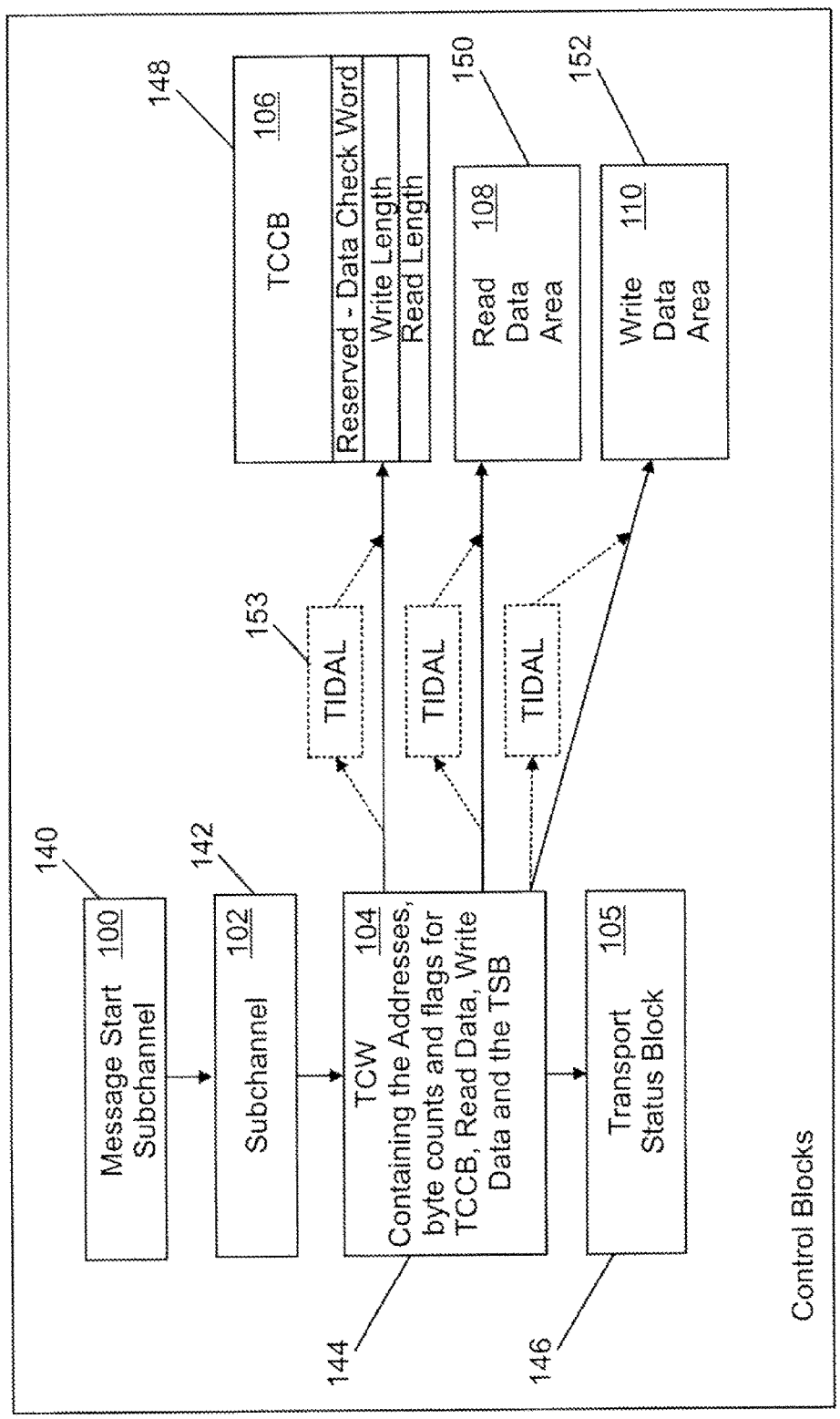
FIG. 2 depicts exemplary control blocks generated by a host computer system for a transport mode I/O operation.

FIG. 2 shows exemplary control blocks that are setup in the host memory, by software, prior to the OS software executing an instruction (e.g., a START SUBCHANNEL instruction) that passes the Start Subchannel message to an I/O processor (IOP) in the channel subsystem 114 for a HPF I/O operation. The architecture of these control blocks and one or more of the above components of the I/O processing system 100 are further described in "IBM® z/Architecture Principles of Operation," Publication No. SA22-7832-8, 9th Edition, August 2010, which is hereby incorporated herein by reference in its entirety.

As shown in FIG. 2, a Start Subchannel message 140 is passed to the channel subsystem 114, which designates a subchannel 142, a TCW 144, and a transport status block (TSB) 146. The TCW contains addresses in the host memory of a TCCB 148, a location 150 of read data designated for the I/O operation, and/or a location 152 of write data designated for the I/O operation. The TCCB 148 and the locations 150 and 152 may be directly or indirectly addressed by, for example, a Transport Indirect Data Address List (TIDAL) 153.

Figure 3:
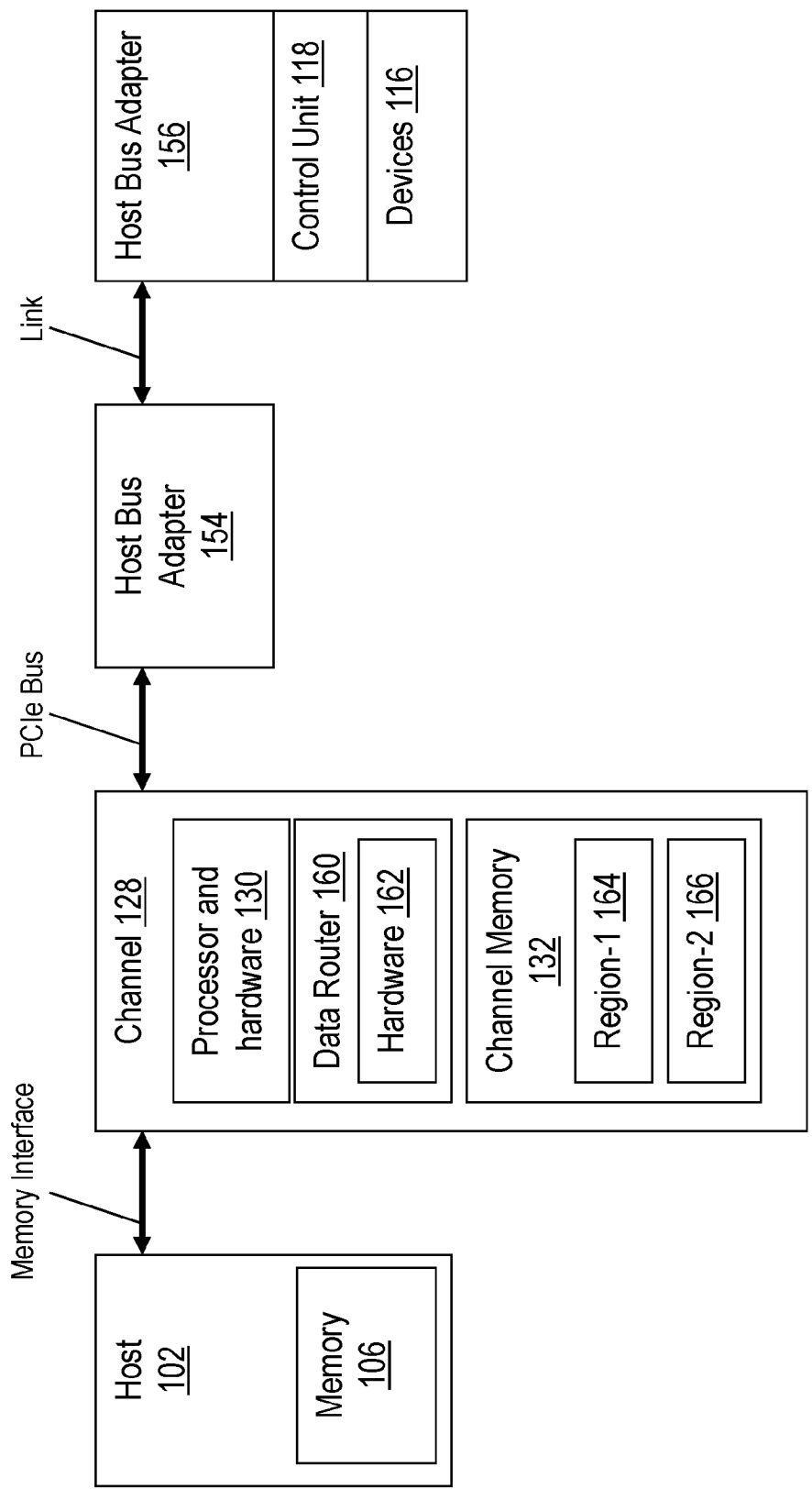
FIG. 3 depicts a configuration of an I/O processing system including a host bus adaptor (HBA) connected to a channel subsystem.

FIG. 3 illustrates an example configuration of a communications link between the host system 102, the channel subsystem 114, and a control unit 118. The channel 128 communicates with the host CPU via a channel microprocessor 130, and is configured to transfer data between the host memory and a local channel memory 132, e.g., for retrieving a TCCB 148 or components of a TCCB 148. A network or link interface such as a host bus adaptor (HBA) 154 is connected to the channel 128 via, for example, a PCIe bus 155. The HBA 154 coordinates the flow of information between the channel 128 and a control unit 118, for example, via a control unit HBA 156. The channel 128 further includes a data router 160.

In one embodiment, the data router 160 is a high performance Fibre Channel data router (HPF-DR) that supports the FC-SB-4 (also referred to as HPF) protocol. The data router 160 allows the HBA 154 to directly access the host memory 106, without needing to store input or output data (i.e., customer data) requested per an I/O operation in the local channel memory 132. In one or more examples, the data router 160 includes data router hardware 162 and a local channel memory region 164 in which state information is setup for the data router to process HBA data transfer requests. As described herein "HBA data transfer requests" include any communications from the HBA 154 to the channel 128 that request the transfer of output data (i.e., write or fetch data) from the host memory to the control unit 118 (e.g., a "HBA write request" or "HBA fetch request") or request the transfer of input data (i.e., read or store data) from the control unit 118 to the host memory (e.g., a "HBA read request" or "HBA store request"). In addition, in one embodiment, the local channel memory 132 includes a region 166 (e.g., before the 4 gig line) that is assigned to the HBA 154 and accessible by the HBA 154, which is used for processing local channel requests and operations.

After receiving the I/O instruction and ORB from the host, and prior to performing the I/O operation and sending the I/O operation to the HBA 154, the channel 128 sets up one or more address control structures and associated address control words (ACWs) that are used to generate host memory requests to the host computer 102 and allow the HBA 154 to directly access the host memory. The ACWs and data control structures also facilitate the data router 160 to append or store headers to or from HBA data transfer requests sent by the HBA 154, as well as facilitate checking the HBA requests for errors without storing the input or output data in the local channel memory 132.

For example, after a start subchannel message 140 is passed to the channel 128 (e.g., via an I/O processor in the channel subsystem 114), the channel microprocessor 130 running firmware receives the start subchannel message 140 to read and/or write data from and to a device 116 and into and out of the host memory. The channel 128 uses the information in the start subchannel message 140 to fetch the subchannel 142. In the subchannel 142 is the host memory address that the channel firmware uses to fetch the TCW 144. The channel 128 uses the information from the start subchannel message 140, the subchannel 142 and the TCW 144 to set up various ACWs. Each ACW is a control block the data router 160 uses to route HBA data transfer requests to a host memory address specified in the TCW 144. Multiple ACWs can be set up, including one ACW for read commands that includes at least one host memory address for storing input data, one ACW for write commands that includes at least one host memory address for output data, an ACW that is used to assemble an I/O command message such as a transport-command information unit (IU) including a TCCB 148, and an ACW for receiving and storing status information.

Along with setting up the ACWs, the channel 128 sets up "address control structures" for each ACW from information in the TCW 144 and passes the address control structures through the local channel memory 132 to the HBA 154 (e.g., via a local channel memory HBA work queue) prior to the HBA 154 being informed of the I/O operation. Multiple address control structures are passed to the HBA 154 and used by the HBA 154 to fetch or store information into or out of the host memory. The address control structures allow the HBA 154 to address multiple address spaces, while also allowing the data router hardware 162 to check stored or fetched data for errors. For example, one address control structure is used for fetching the information that makes up the command message (e.g., transport command IU), one is used for storing the ending status from the control unit response (e.g., a transport status IU) at the completion of an I/O operation, and multiple "data address control structures" may be used by the HBA 154 for transferring input or output data. For example, one "read address control structure" is used for every 8 megabytes of read data transferred from a device 116 to the host memory, and one "write address control structure" is used for every 8 megabytes of data requested from the host memory. Only the read or the write address control structure is required if the I/O operation only transfers data in one direction.

Each address control structure includes an address sent to the HBA 154 that is used by the HBA to make requests to the channel 128. The address is seen by the HBA 154 as a single address, but is used to refer to multiple address spaces in the host memory. Exemplary address control structures each include a 64 bit PCIe address, a data byte count, direction bits and control information. For example, each address control structure includes a data byte count of the amount of data to be transferred by that address control structure and control bits that inform the HBA 154 the direction the data is to be transferred and how many address control structures are required to transfer the data.

FIG. 4 illustrates embodiments of an address field 172 of an exemplary address control structure 170. In the illustrated example, the address field 172 includes 64 bit PCIe address, but is not limited thereto. The address field 172 includes a control (CTL) field 174 (e.g., byte 2 of the address 172) that indicates whether to route an HBA request to local channel memory to be handled internally by the channel 128, or whether to process and route the HBA request to the host memory via the data router 160. For example, if the address field 172 includes the CTL field 174 set to zero, the data router 160 routes the request to the local channel memory region 166. However, if the CTL field 174 is set to a selected value (e.g., 0x02), the address 172 is configured to allow the HBA 154 to address the host memory via the data router hardware. In this configuration, the address 172 (shown in row 3 of FIG. 5) is divided up into four fields: an ACW Index field 176 (e.g., bytes 0 and 1), the CTL field 174 (e.g., byte 2), a Validation field 178 (e.g., bytes 3 and 4), and an Offset field 180 (e.g., bytes 5-7). In one or more examples, the ACW Index field 176 is the index into a contiguous block of ACWs in the local channel memory region 164, and is used by the data router hardware 162 to locate an ACW for an associated HBA request and address control structure. The Validation field 178 (e.g., a 16 bit field) is set to a unique value for each ACW defined in the local channel memory region 164.

After the channel 128 sets up the ACWs and the address control structures 170 for an I/O operation, the channel 128 informs the HBA 154 of the pending I/O operation and sends the corresponding address control structures 170 required for executing the I/O operation.

Figure 5:
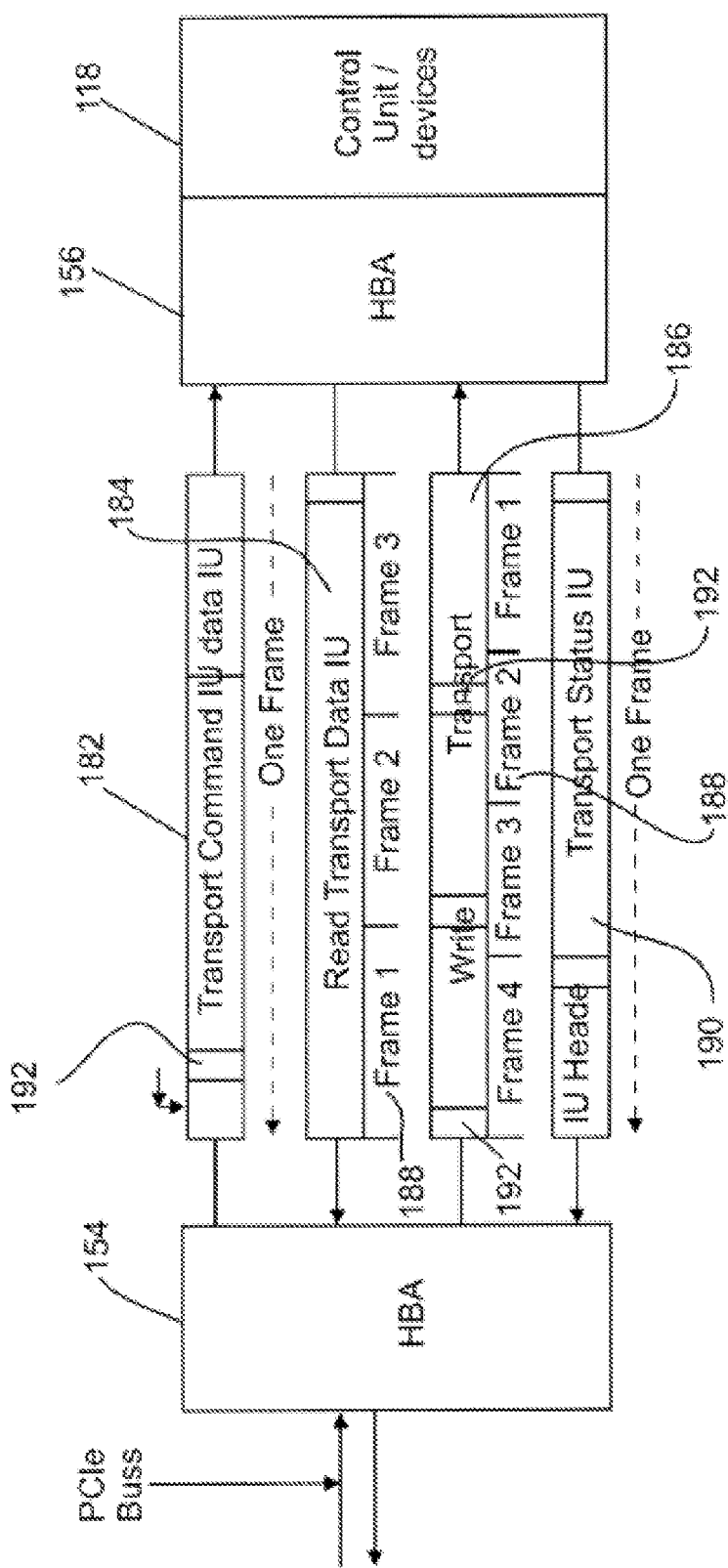
FIG. 5 depicts an example of various messages transmitted between a channel and a control unit during a transport mode I/O operation.

FIG. 5 illustrates various messages transmitted between the channel 128 and the control unit 118 during an I/O operation. After the channel microprocessor 130 has set up the data router 160 with the required information, the HBA 154 fetches and stores various information units (IUs). A transport command IU 182 includes the TCCB 148 and header information and is sent over the channel path 122 to the control unit 118. During execution of the I/O operation, data IUs including a read transport data IU 184 and/or a write transport data IU 186 are transmitted to send input and/or output data. In one embodiment, each data IU, depending on its size, may be sent as one or more frames 188. A frame 188 is a unit or packet of data that is transmitted within a link wrapper on a link or channel path, and has a maximum size that depends on the link architecture. At the conclusion of an I/O operation, a transport status IU 190 is sent from the control unit 118 that indicates the transport status of the operation (e.g., completed or aborted). Typically, the transport command IU 182 and the Transport Status IU 190 are each transmitted on the link with one frame. In one embodiment, each frame of an IU requires at least one HBA request (e.g., PCIe request) from the HBA 154.

In one or more examples, the IUs include one or more data check words 192 (e.g., CRCs) located at the end of or close to the end of an IU. For example, a data check word 192 for the transport command IU 182 is either 1 or 2 words from the end of the IU. A write transport data IU 182 may have multiple intermediate data check words 192, each checking a portion of the write transport data IU 182. The transport status IU 190 has a data check word 192 for the IU header and a data check word 192 for the transport status.

Figure 6:
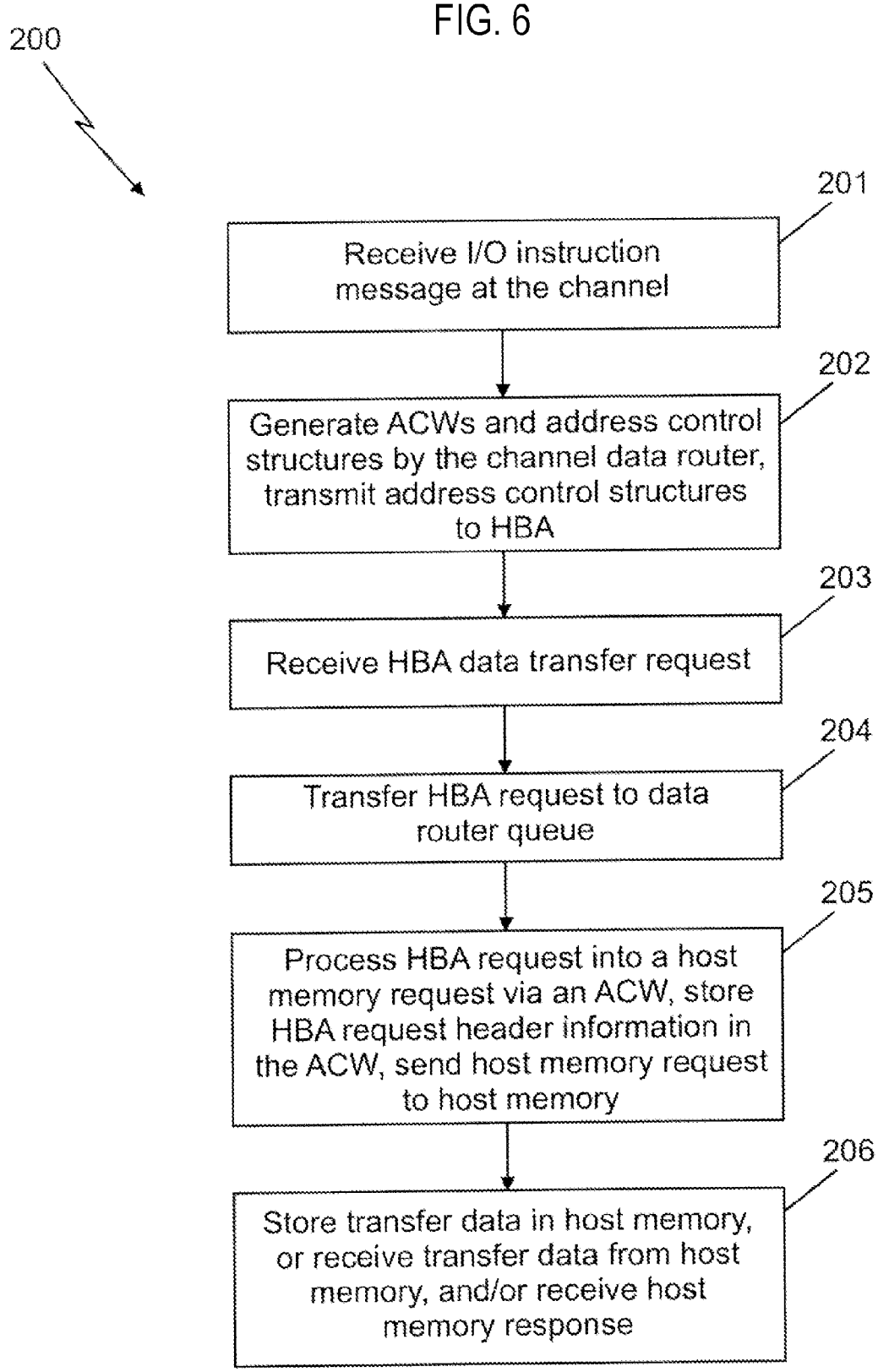
FIG. 6 is a flow chart depicting an exemplary method of processing data transfers via a channel data router and a HBA during an I/O operation.

FIG. 6, illustrates a flowchart of an example method 200 for performing an I/O operation. The method includes one or more stages 201-206 illustrated in FIG. 7. In one embodiment, the method includes the execution of all of the stages 201-206 in the order described. However, in one or more examples certain stages may be omitted, stages may be added, or the order of the stages changed.

The method includes receiving, by the channel 128, an instruction message 140 and ORB from the host CPU 104, and, in response, fetching the subchannel 142 and the TCW 144, among other required data, as shown at 201.

The channel 128 or the data router 160 generates address control structures 170 and corresponding ACWs 210 (see FIG. 7), as shown at 202. Exemplary control structures 170 and ACWs 210 include a Transport Command ACW and a Transport Command Address Control Structure corresponding to the transport command IU 182, a Transport Read Data ACW and one or more Transport Read Data Address Control Structures corresponding to one or more read transport data IUs 184 or frames, a Transport Write Data ACW and one or more Transport Write Data Address Control Structures corresponding to one or more write transport data IUs 186 or frames, and a Transport Status ACW and Transport Ending Status Address Control Structure corresponding to the transport status IU 190. The data router 160 transmits the address control structures 170 to the HBA 154. A list 212 of the ACWs 210 is assembled in the local channel memory region 164.

Figure 7:
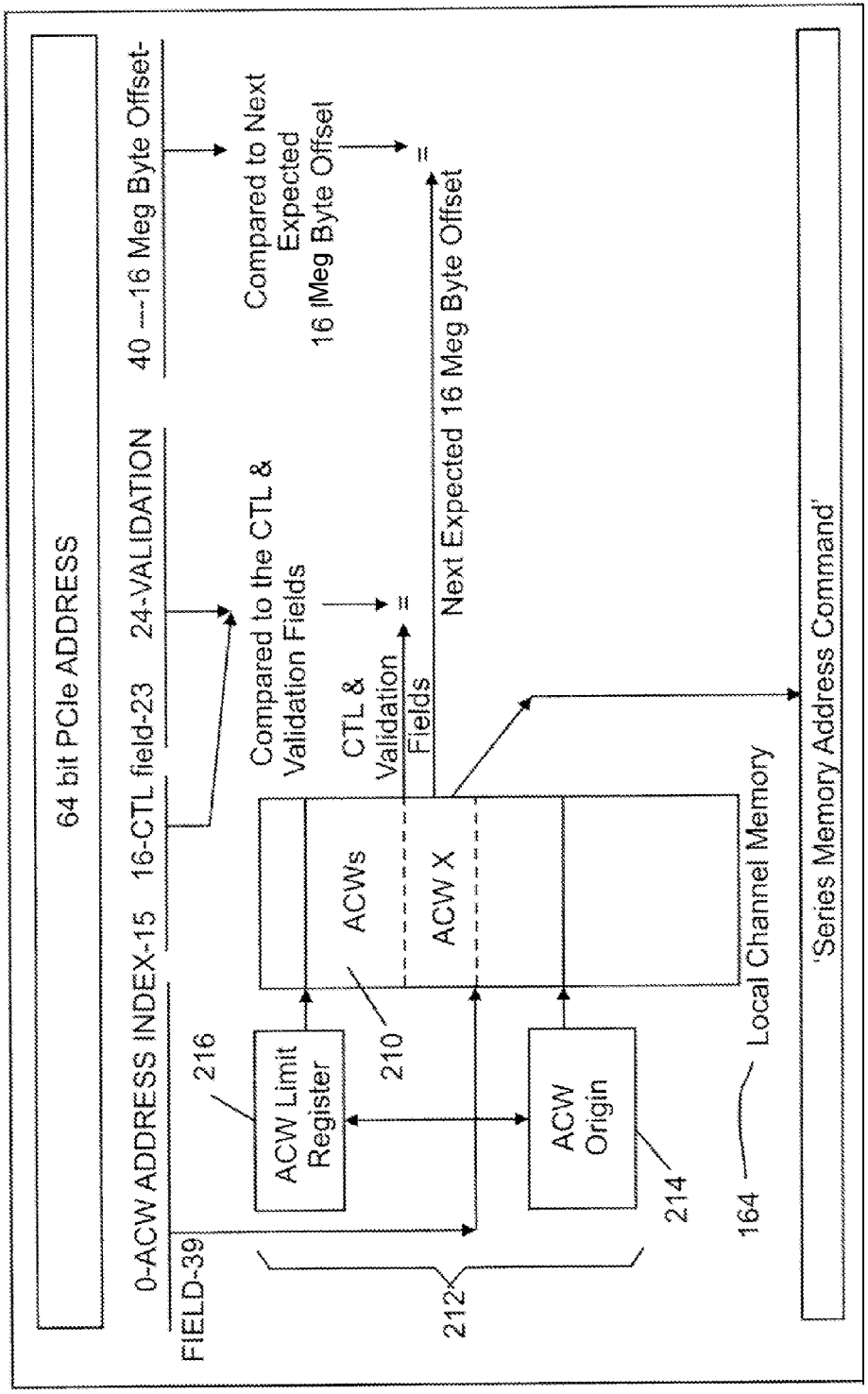
FIG. 7 depicts an embodiment of a channel local memory region utilized by a data router.

FIG. 7 illustrates a configuration of the data router 160 that includes the ACWs 210 stored in the local address memory region 164. In one or more examples, the memory region 164 is the HBA address space located above a selected boundary (e.g., the 1 terabyte boundary) in the local channel memory 132 that houses a list 212 of the ACWs 210 used to address the host memory. In one embodiment, the list 212 is a list of contiguous ACWs. An ACW Origin Register 214 is the starting address of the list 212 of ACWs 210. The ACW Index 176 from the ACW Index field 176 in a data control structure is added to the ACW Origin 214 to generate a local address where the corresponding ACW resides in the local channel memory region 164. The ACW Limit Register 216 is the ending address of the list 212 of ACWs 210. When the ACW Index 176 is added to the ACW Origin to fetch an ACW, the result cannot be larger than the ACW Limit minus the ACW size.

Referring back to FIG. 6, the method includes assembling a transport command IU 182 at the HBA 154 for transmission to a control unit 118, as shown at 203. The HBA 154 uses the Transport Command Address Control Structure to initiate a fetch of the TCCB 148 from the host memory 106, by sending a HBA fetch request to the data router 160. In one or more examples, the requests sent to and from the HBA are controlled by the PCI Express (PCIe) protocol, although other protocols could be used.

Figure 8A:
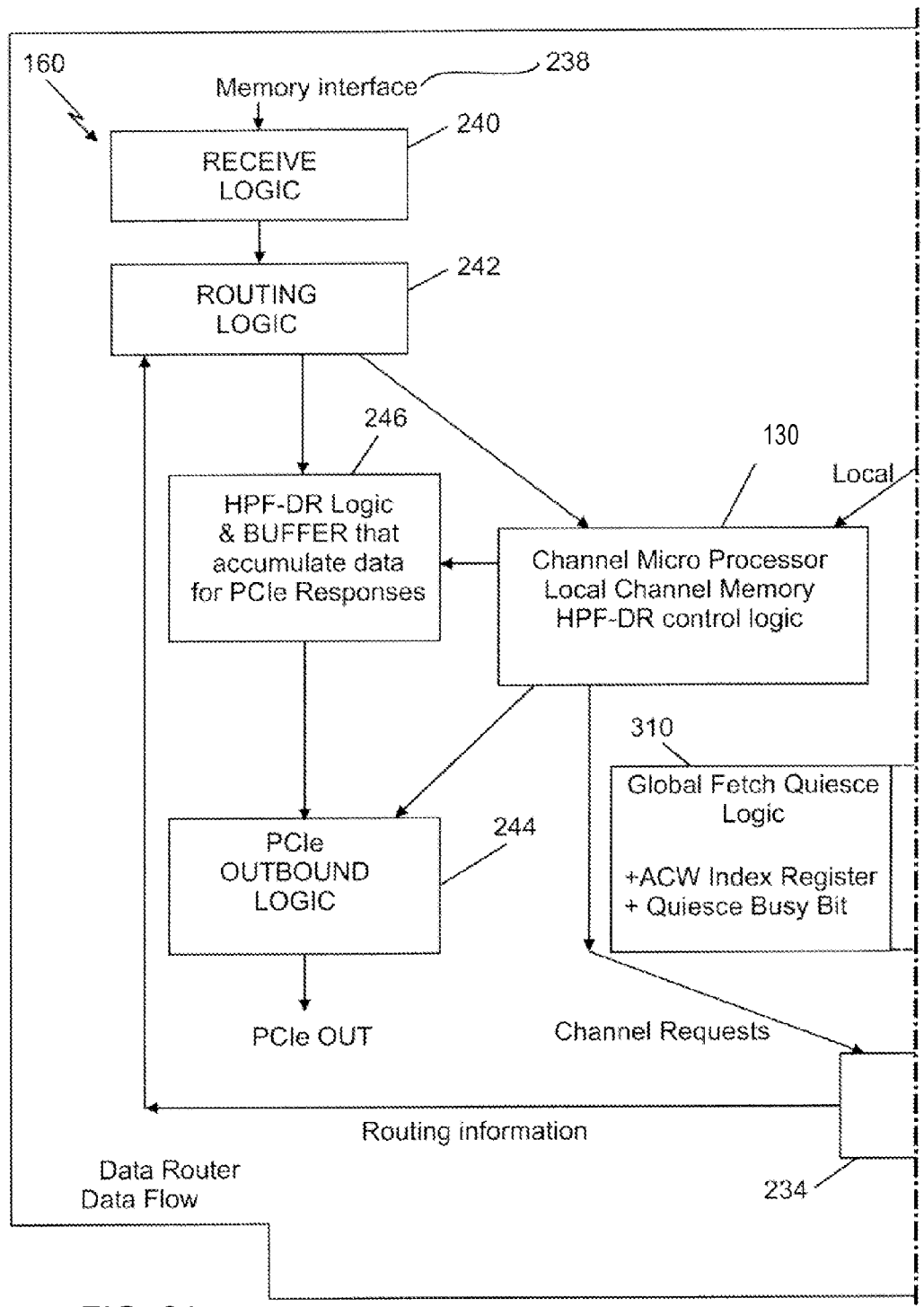
FIG. 8A is a block diagram depicting part 1 of the data flow through logical components of a data router.

Referring now to FIG. 8 along with FIG. 6, the HBA fetch request arrives at the data router 160, which is received by receiving logic 220 that converts the bits sent from the HBA 154 into data packets, and is routed by routing logic 222 based on the HBA address 172 in each packet, as shown at 204.

For example, all HBA requests with an address designating the local memory area (e.g., below 2^40) are routed to the channel microprocessor 130 and local channel memory area 166 and handled internally as local channel memory requests. In one or more examples, any time a PCIe bus is in 64 bit addressing mode and the CTL field 174 is 0x00, or when a PCIe operation is in 32 bit mode, the BHA request is routed to the local channel memory. This allows the HBA 154 to have direct access to the local channel memory area that the HBA 154 has access rights to. The HBA 154 is not given direct access rights to the local channel memory area 164 where the ACWs 210 reside.

All requests with addresses in the memory area 164 (e.g., above 240) are routed to either a Fetch Array Queue 226 or a Store Array Queue 228 to be handled by the data router 160. The entire data packet (header and data) received from the receiving logic 220 is saved as an entry in either of these two arrays. The Fetch Array Queue 226 and the Store Array Queue 228 are located in Data Router Fetch hardware 230 and Data Router Store hardware 232, respectively, which process HBA requests from these queues into host memory requests that are transferred to the host memory.

The processing logic 234 queues and prioritizes the channel requests in the local channel memory area 164 and the HBA requests in queues 226 and 228, and processes the request packets into host memory packets, as shown at 205 in FIG. 6.

The processing logic 234 takes the ACW index field 176 of the HBA address (from the Transport Command Address Data Control Structure) in an HBA request packet to index into the list of ACWs 210 set of ACWs starting at the ACW Origin Register 214 to fetch the ACW corresponding with the HBA address 170. In the illustrated example the desired ACW is a Transport Command ACW. For example, the processing logic 234 takes the ACW Index value and adds it to the ACW origin register 214 to generate a local channel memory address from where it fetches the ACW. Based on the memory address field in the ACW, the processing logic 234 generates a host memory request that is sent from transmit logic 236 to the host memory (via, for example, a host memory interface 238) indicating the memory address from which data is transferred or to which data is stored. Additional information from the ACW, including a Zone ID, a Key value a data length may also be used to generate the host memory request.

In this embodiment, the address in the ACW's memory address field is the location or locations of the TCCB 148. If indirect data addressing is not enabled in the ACW, then the host memory address is the address of the entire TCCB 148. If indirect data addressing is enabled in the ACW, then the data router 160 fetches a Transport Indirect Data Address Word (TIDAW) from the host memory address and then uses the address in the TIDAW as the host memory address.

Referring again to FIG. 6, the data router 160 receives a host memory response via host memory receive logic 240, which includes the TCCB 148 in the current example, as shown at 206. In one or more examples, depending on the host memory request, the host memory response may include output data for a write command or a status message for a read command. Routing logic 242 routes the host memory response to a data buffer and logic 246. The data buffer and logic 246 merges IU Header information from the Transport Command ACW (i.e., from the IU Header field) with the TCCB 148 in a response packet which may be returned to the HBA 154 via outbound logic 244 that interfaces with the HBA 154. For I/O operations that include multiple output data requests, the data buffer 246 may accumulate data from the multiple requests to generate a complete response packet back to the HBA 154.

As described herein, during the execution of an I/O operation, transport data IUs may be transmitted between the HBA 154 and the control unit 118. To execute write commands, the HBA 154 requests information to assemble a write transport data IU 186, including output data from the host memory (the address of which is specified by the Memory Address field of the write ACW) and IU header information retrieved from the write ACW. To execute read commands, the HBA stores input data from a read transport data IU 184 to a host memory address specified in the Memory Address field of the read ACW and storing IU header information from the read transport data IU 184 to the read ACW.

For example, the HBA 154 receives a read transport data IU 184 and generates one or more HBA read requests that are sent to the channel 128 to store input data into the host memory 106. Each read request includes an address field 172 from a corresponding Read Data Address Control Structure. The HBA read request is received by the receive logic 220, and the routing logic 222 routes the HBA read request to the Store Array Queue 228. The ACW Index field 176 of the address field 172 is used to index into the list of ACWs 210 as described above, and fetch the read ACW. The read transport data IU header information is stored in the Read Data ACW, and a host memory read request is sent to the host memory 106 to request storage of input data in the address(es) specified by the Read Data ACW.

In one embodiment, it may take multiple host memory read requests to store one HBA read request. For example, if each host memory read request is 256 bytes and a HBA read request is 2048 bytes, then it takes eight host memory read requests to store the one HBA read request. In this embodiment, the host memory read responses are returned from the host memory interface 238 to the data router hardware 162, which correlates each response to each read request that was made.

Alternatively or in addition, in one or more examples the HBA 154 may send a write transport data IU 186 to the control unit 118. In one or more examples, unless Transport Ready is disabled, the channel 128 checks if a transfer-ready IU has been sent from the control unit 118 prior to sending each write transport data IU 186. The control unit 118 may request additional data by sending additional transfer-ready IUs until it has requested all the data specified by the TCCB 148.

If Transfer Ready is disabled, which allows the HBA 154 to send an IU of data to the device 116 without the device 116 asking for the data IU, then the HBA 154 initiates HBA write requests to the data router 160. The HBA 154 uses the address field 172 from each Write Data Address Control Structure to send each HBA write request to initiate fetching the data from the host memory. Each HBA write request is received by the routing logic 222, which routes each HBA write request into the Fetch Array Queue 226. The ACW index field from the address field 172 is used to fetch Write Data ACW from the local channel memory region 164. One or more host memory write requests are used to request output data, which is received from the host memory 106 in a host memory write response and sent to the HBA 154 through the routing logic 242 and the data buffer 246 to the HBA 154. If multiple host memory write requests are needed to process one HBA write request, then each host memory write response is processed as described with reference to the read requests described above.

Figure 9:
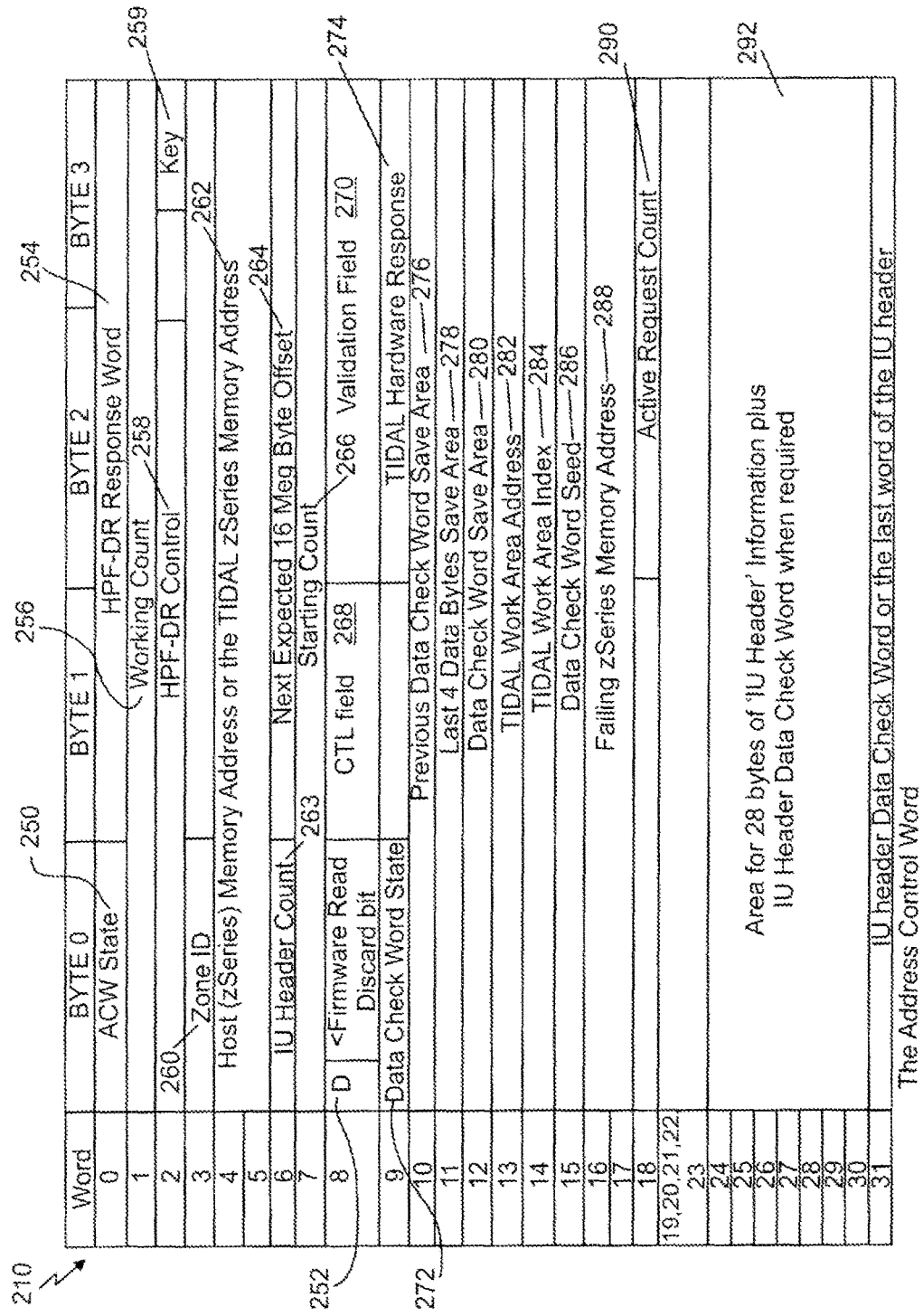
FIG. 9 depicts an example address control word (ACW)

FIG. 9 shows an embodiment of an Address Control Word (ACW) 210 that is set up by Firmware (of the channel 128) in the local channel memory 132 and is used by the data router 160 to translate between HBA memory requests and host memory requests. After each host memory request is processed, the data router hardware 162 updates information in the ACW 210 so as to be ready for the next HBA request using this ACW 210. An exemplary ACW 210 includes the following fields.

An ACW State field 250 (e.g., word 0 byte 0) provides the state of the ACW. For example, bit 0 (the ACW Valid bit) is set by firmware to one when the ACW is set up for an I/O operation, indicating that the ACW is a valid ACW. States are defined in, e.g., bits 4-7, and include the following codes:

0—Idle/Read setup. Firmware sets this state when the ACW has been set up to receive data;

1—Write setup. Firmware sets this state when the ACW has been set up to transmit data;

2—ACW IU Header Area Secure. The data router hardware changes the ACW state from state 0, 1 or 3 to state 2 when an entire IU Header has been transferred to or from the HBA for fetches or stores. When receiving data from the link, the entire IU Header must have been received and stored into the ACW header area before the ACW State 250 is set to state 2. The data router hardware does not access the IU Header Area in the ACW once the ACW State is set to 2. Once the ACW is set to State 2 it stays in State 2 until Firmware changes it. If no header data exists for the IU then Firmware may set the ACW State to state 2.

3—IU Header In Progress. Hardware sets state 3 from either state 0 or 1 when a PCIe request only transfers part of the IU Header. The ACW State stays in State 3 until subsequent PCIe requests complete the transfers of the entire IU Header, then the ACW State is set to state 2.

A Read discard or drop bit (e.g., bit 2 of the ACW State 250) may be set by the data router if an exception encountered when forwarding a host memory request to the host memory. For HBA store requests, the Read Discard bit is set so that all HBA requests to store data into the host memory will result in the data being discarded and also not accumulated in the Data Check Word Save Area 280. Conditions that set this bit include any exceptions received on host memory stores for this ACW and any time the HPF-DR Response Word 254 bit 8 ("a Missing PCIe Request") of this ACW is set to a one. For HBA fetch requests, the Write Drop bit (e.g., ACW State 250, bit 3) may be set so that any HBA fetch requests for this ACW will receive a PCIe 'Transaction Layer Protocol' (TLP) Completion with the Completion Status set to Completer Abort. Conditions that set this bit are any exceptions received on host memory fetch requests for this ACW set by Global Fetch Quiesce hardware when requested by Firmware for this ACW.

In one or more examples, when an inbound HBA request is processed and a Firmware Read Discard bit 252 is set, the data router hardware sets the Read Discard bit to a one and the Missing PCIe Request bit to a one. The actions then taken by the data router hardware are listed in an HPF-DR Response Word (described below) under bit 8. Firmware uses this bit to recover an ACW, which has a HBA store request stuck in the Store Array Queue 228 that cannot be processed because a previous BHA request has not been received for this ACW.

An HPF-DR Response Word field 254 (e.g., word 0 bytes 1, 2, 3) includes a HPF-DR Response Word which is the ACW ending status information provided by the data router hardware to Firmware at the completion of an I/O operation. Examples of ending statuses and their corresponding exemplary bits include:

Bit 8—Missing HBA Request: This bit may be set to one when a "deferred" HBA store transaction for this ACW exceeded the configured 'Time To Live'. This occurs if the data router hardware had previously re-en-queued this HBA request because of an out of order condition, and the time that the request has been waiting in the Store Array Queue 228 for missing HBA requests to be received exceeded the configured Time To Live. This bit may also be set to one when an inbound HBA (read) request is processed and the ACW Firmware Read Discard bit is set to a one. Actions performed when the Missing HBA Request condition include storing the IU Header (if any) in the ACW, discarding IU data (if any) without accumulating it in the Data Check Word, and setting the Read Discard Bit 2 of the ACW State field 250 to a one. After these actions are performed, the Active Request Count for this ACW is decremented by one.

Bit 9—Memory Request Threshold exceeded: The number of host memory requests needed to satisfy one HBA request exceeded a set Memory request threshold.

Bit 10—TIDAL format check: The TIDA List address or a TIDAW did not conform to protocol format rules. The address of the failed TIDAW is written into the Failing zSeries Memory Address field of this ACW.

Bit 11—Overflow on Working count: When data is being fetched from or stored into host memory by the data router, and the total byte count of data, pad bytes and Data Check Words attempted to be transferred to or from the PCIe bus, exceeded the byte count of data specified by the ACW Working Count.

Bit 12—Duplicate HBA fetch request or an invalid HBA store request received from the HBA: A duplicated HBA fetch request will not be processed, instead a Completer Abort completion TLP is returned to the HBA. The Write Drop Bit (ACW State Byte bit 3) is set to a one; or, for an invalid HBA store request, this bit and the Read Discard (ACW State Byte bit 2) is set to a one, and all subsequent HBA store requests for this ACW are discarded.

Bit 13—Active Request Count=Zero: Whenever the data router hardware updates the ACW Active Request Count in the ACW, it sets this bit equal to the NOR of all the bits of an Active Request Count field 290 defined below.

Bit 14—ACW Wrapped: This bit is set to a one when the 24 bit Next Expected 16 Meg Byte Offset field wraps from 0xFFFFFF to 0x000000. This ACW Wrapped bit being set to a one blocks the data router hardware from interpreting the 16 Meg Byte Offset values of 0x000000 to 0x00001F for this ACW as IU Header information.

Bit 15—TIDA fetch host memory error: This bit is set when all of the following statements are true: An exception or bad hardware response was received in response to a host memory fetch request for a TIDAW entry in a TIDA list; a HBA request for data was received from the HBA required this unavailable TIDAW; and no previous errors were detected for this I/O operation. The error indication received from the receive logic 240, is stored in the ACW TIDA Hardware Response field ACW word 9 bytes 2 and 3. The address that caused this error is written into the Failing zSeries Memory Address field ACW words 16 and 17.

Bit 17—Data Check Word mismatch: For stores to host memory, the computed Data Check Word did not match the received Data Check Word. Posted only if Data Check Word checking is enabled in the ACW by HPF-Control bit 3 and the Read Discard, bit 2, is not set to a one.

Bit 18—Direction error: The ACW Direction bit 0 in the HPF-DR Control Word did not match the direction of the HBA request for this ACW.

Bit 21—host memory Response Error: An error was received from a host memory request. In one embodiment, the error byte, detailing the error, from host memory Response is written into bits 19-20 above and bits 24-31 below of this ACW Status field. The host memory address which caused the error is written to the Failing zSeries Memory Address field of this ACW.

Bit 22—IU Header Data Check Word mismatch: Hardware checks the IU Header Data Check Word on the 28 bytes of IU Header information for all inbound IUs if not disabled by HPF-DR Control Word bit 16 in the ACW. If the IU Header Data Check Word fails, any data payload present in the IU is discarded.

If any of the above errors indicated in an ending status in an HPF-DR Response Word are encountered while storing data from the HBA to the host memory, the remaining bytes in the HBA request and all subsequent HBA requests for the IU are discarded. This is enforced with the Read Discard bit in the ACW State being set to a one when any one of the error bits 8-12, 15, 17, 18, 21, and 22 in this word are set to a one. If an error is detected while fetching data from host memory to transfer across the PCIe bus, the HPF-DR hardware will signal the PCIe output Logic 244 to return a Completion TLP with the Completion Status set to Completer Abort. This will cause The HBA to abort the exchange that initiated the host memory fetch request that caused the exception. All subsequent HBA requests to this ACW are responded with the same Completion TLP with the Completion Status set to Completer Abort. This is enforced with the Write Drop bit in the ACW State being set to a one when any one of the error bits 8-12, 15, 17, 18, 21, and 22 in this word are set to a one. If the HPF-DR hardware encounters an ACW with the Valid (Bit 0) set to 0, or with an invalid ACW State, (0 and 4-F for fetches, or 1 and 4-F for stores), a HPF-DR hardware Channel Control Check is posted.

Referring again to FIG. 9, the ACW may also include a Working Count field 256. This field is initialized from word 7 of the Starting Count field (described below) when the first HBA request for this ACW is processed by the data router. The data router hardware decrements this count as data is fetched or stored from or into host memory. Data is not stored into host memory 106 after this count has decremented to zero. Any data received from the PCIe bus after this count goes to zero is dropped, and the 'Overflow on Working Count' bit is set to a one in the HPF-Response Word field. This count is not decremented for data bytes discarded or dropped if either the Write Drop or the Read Discard bit is set to a one in the ACW State byte. The residual value of this count is invalid if any error bit has been set to a one in the HPF-Response Word 254 that indicates an error was received in a host memory response.

A HPF-DR Control Word field 258 is set up by Firmware and controls the functions the data router performs. Exemplary functions (corresponding to exemplary bits in this field associated with data check word) are described as follows:

Bit 0—ACW Direction: Set to '1'b for a fetch from host memory. Set to '0'b for a store to host memory. This bit must match the HBA requests that reference this ACW otherwise 'Direction error' bit 18 in the HPF-DR Response Word is set to a one.

Bits 1-2—"IU Data—Data Check Word Select": These bits are encoded with the following code points to inform the data router hardware of the Data Check Word type for Data IUs If bit 3 below (Data Check Word is enabled) is set to a one, the following codes indicate the type of Data Check Word used:

0—Use Data Check Word type 1. (LRC)
1—Use Data Check Word type 2. (Check Sum)
2—Use Data Check Word type 3. (CRC)
3—Use Data Check Word type 4.

Bit 3—"IU Data—Data Check Word Enable": A value of '0'b indicates OFF, i.e., there is no Data Check Word checking/generation for this entry. A value of '1'b indicates ON, i.e., Data Check Word checking/generation per the encode of bits 1-2 above is enabled for this ACW.

Bits 4-5—IU Header Data Check Word Select encode: Bits 4-5 are encoded with the following code points to inform the data router hardware of the Data Check Word type for the IU Header if bit 16 below is set to a zero (IU Header Data Check Words are enabled):

0—Use Data Check Word type 1. (LRC)
1—Use Data Check Word type 2. (Check Sum)
2—Use Data Check Word type 3. (CRC)
3—Use Data Check Word type 4.

Bit 16—Suppress IU Header Data Check Word: A value of '0'b (OFF) indicates that IU Header Data Check Word checking/generation per the encode of bits 4-5 above is enabled for this ACW. A value of Tb (ON) indicates that the Data Check Word field in inbound IU headers is not checked. The Data Check Word field in outbound headers is not modified and is sent as set up in the ACW.

Bits 22-23—Payload Data Check Word Location: This two bit encode represents the number of words from the end of the payload where the Data Check Word is located for write operations. This encode is ignored for read operations.

Referring again to FIG. 9, the ACW may also include a Key 259 that is set up by Firmware. The Key is taken from the ACW and inserted by the data router hardware in the host memory request used to access host memory. A Zone ID field 260 is set up by Firmware and is taken from the ACW and inserted by the data router hardware in the host memory request used to access host memory.

A Host Memory Address field 262 indicates the starting address in host memory where the data for this ACW is to be fetched from or stored into (e.g., if bit 17 of the Control Word field is one) or the starting address of the Tidal Indirect Data Address List (TIDAL) (e.g., if bit 17 is zero). The host memory address in the ACW is either the host memory Address of the Data or the address of the start of a Transport Indirect Address List called a TIDAL. Each entry in a TIDAL is a TIDAW that is the starting host memory Address for the number of bytes of data that is in the count field in the TIDAW. If a TIDAL is indicated by bit 17 in the HPF-DR Control Word then the HPF-DR hardware fetches the TIDAL from host memory then uses the address in each TIDAW to fetch or store data in host memory.

An IU Header Count field 263 is used by the data router hardware to track the number of IU Header bytes left to be transferred to or from the ACW from or to the PCIe bus. The IU Header Count is initialized by Firmware to the number of IU Header bytes to be transferred out of or into the ACW bottom to or from the PCIe bus at the beginning of the transmission or the reception of an IU.

A 24 bit "Next Expected 16 Meg Byte Offset" field 264 is initialized by Firmware when the ACW is set up. This Offset field, although described as a 16 Megabyte Offset, may be configured for other desired offset configurations. As each HBA fetch or store request is processed, the data router hardware will check the 16 Meg Byte Offset 180 in the HBA address against the Next Expected 16 Meg Byte Offset field in the ACW. If they match, the data router hardware moves the data, if it is the IU Header to or from the bottom of the ACW, and any customer data, to or from host memory. The data router hardware then increments the Next Expected 16 Meg Byte Offset field in the ACW by the HBA transaction size. In one embodiment, to make use of a 4 byte Working Count field, using a Next Expected 16 Meg Byte Offset field that is 3 bytes, the Next Expected offset may wrap from 0xFFFFFF to 0x000000 up to 255 times before the Working Count transitions to zero. The first time the Next Expected offset wraps, the ACW Wrapped bit (bit 14 in the HPF-Response Word field 254) is set to a one in this ACW.

A Starting Count field 266 is used by the Firmware to load the number of bytes of data to be transferred for the I/O operation under control of this ACW. This count does include all of the inserted pad and Data Check Word bytes on transmitted data but does not include the IU Header bytes or the final pad and Data Check Word bytes on transmitted or received data. The data router hardware transfers this count to the Working Count field 256 when the first HBA request is processed for this ACW. The data router hardware does not modify the Starting Count in the ACW.

A CTL field 268 and a Validation field 270 are compared by the data router hardware with the corresponding CTL field 174 and Validation field 178 in the address field 172 received from the HBA. If they are not equal, an error is posted, and the host memory operation is not performed. This error results in a Channel Control Check.

For HBA stores, a Data Check Word State field 272 is used by the data router hardware to track which of the data bytes in the Last 4 Data Bytes Save Area (described below) in the ACW will be used for the Data Check Word calculation in the next transaction for this ACW. This is required for the case where a HBA store request did not end on a word boundary relative to the beginning of the data transfer and the calculation of the Data Check Word can only be done on four byte words of data on word boundaries. Therefore, up to three bytes of previously received data and the boundary state information must be saved in the ACW, until the subsequent bytes of data are received, to continue the calculation of the Data Check Word.

A TIDAL Hardware Response field 274 is used to store a host memory exception or a bad data router hardware response that is received for a fetched TIDA List. Bits 2-15 of this field have the same definition as bits 18-31 of the HPF-DR Response Word field 254. Because the TIDA List may be pre-fetched by the HPF-DR hardware before its use is required, this bad response will not be reported as an error by Firmware unless a HBA request is received from the HBA to transfer data that would have used this unavailable TIDAW. This latter condition is indicated to Firmware by bit 15 of the HPF-DR Response Word field 254.

A Previous Data Check Word Save Area is used by the data router hardware to save that next to last interim Data Check Word value at the end of each HBA store transaction. This interim value is not modified by calculations using the last 4 data bytes received. Thus, if the current HBA transaction completes the operation, this field contains the final calculated Data Check Word value for the operation and the last 4 data bytes received is the received Data Check Word which is saved in the following field in this ACW.

A Last 4 Data Bytes Save Area 278 is used by the hardware to store the last 4 data bytes received on each HBA request. For HBA requests other than the last, up to three of these bytes may be required for subsequent Data Check Word accumulation if the current HBA request did not end on a word boundary. Information as to which bytes are needed is recorded in the Data Check Word State 272. For the last HBA request, this field contains the received Data Check Word. In one embodiment, for HBA PCIe fetches, this field holds up to the last four data bytes based on the last previous 4 byte PCIe boundary. So if the PCIe address ends with 1, this field holds the last byte transmitted. If the PCIe address ends with 2, this field holds the last two bytes transmitted and so on up to the last four bytes.

Data Check Word Save Area 280 is used by the data router hardware at the end of each HBA transaction (fetch or store) to save the interim calculated Data Check Word value, which is used to seed the next transaction for this ACW.

A TIDAL Work Area Address 282 is an address of a 256 byte work area that is located in the Local Channel Memory, and is used by data router hardware to buffer TIDA List elements pre-fetched from host memory by the data router hardware. Firmware sets this field to point to the assigned area for this ACW. A TIDAL Work Area Index 284 is the index into the Local Channel Memory TIDAL Work Area which points to the current active TIDAW entry and is maintained by the data router hardware.

A Data Check Word Seed field 286 is used by the Firmware to write the initial Data Check Word Seed value in this word. This word is used as the starting seed for the Data Check Word computations both at the beginning of the data transfer for this ACW on reads and writes, and also for 're-seeding' following the processing of the 'Insert Data Check Word' TIDAW flag in a TIDAW when that TIDAW count transitions to zero for writes. For the Transport Command ACW, Firmware takes the original seed for the Transport Command IU and calculates a new value for the Transport Command IU ACW seed by updating the starting Data Check Word seed for the Transport Command IU with the IU Header and the Write and or Read length field(s) that are at the end of the Transport IU. Thus, the Transport Command IU Data Check Word covers the entire Transport Command IU even though the data router hardware takes the Seed from the ACW, and only calculates the Data Check Word on the Transport Command IU data portion of the IU. The data router hardware then inserts the Data Check Word into the IU and then transmits the Write or the Read length field or if the I/O operation transfers data in both directions then both the Write and Read length fields are transmitted.

A Failing Memory Address 288 is used to store an address of a memory area that caused an exception, and the appropriate error bits are set in the HPF-DR Response Word 254.

An Active Request Count counter 290 is used by the ACW to keep track of how many HBA requests currently resides in the Store Array Queue 228 for this ACW. This counter is incremented for every HBA request that is stored into the Store Array Queue for this ACW and is decremented when the HBA request has been processed. A HBA request for this ACW is considered processed when one of the following occurs to the request: all of the host memory requests for a HBA request has completed with a host memory response; all data for the HBA request has been dropped if the Read Discard bit, bit 2, was set to a one; or all of the IU Header information is stored in the ACW for a HBA request that only contains IU header information. Whenever the data router hardware updates the ACW Active Request Count in the ACW, it sets the Active Request Count=Zero (HPD-DR Response Word 254, bit 13) to the NOR of the bits of the Active Request Count. Thus, when the HPF-DR hardware decrements the Active Request Count to 0, the Active Request Count=Zero bit will be set to a one.

An IU Header Information field 292 is used to store command, status and/or data IU headers used in the I/O operation. In one embodiment, this field is an area for 8 words of 'IU Header' Information. IU Header information is the first data transferred to or from a device in an IU on the Link if the IU contains an IU Header. The IU Header information is used or generated by the channel but is not part of the data to be stored or fetched into or from host memory. Therefore, this information is checked or generated by the channel microprocessor firmware. The bottom 8 words of the ACW control block is used to buffer the IU Header and used as the interface between the data router hardware and Firmware for the IU Header.

The IU Header information is the first data transferred across the PCIe bus when the ACW is a Read Data ACW or a Write Data ACW. When the data router hardware completes the transfer of the IU Header, it changes the ACW State field 250 value to 2. For IU transmissions, Firmware builds the IU Header in the ACW prior to signaling the HBA to transmit the IU. For received IUs, Firmware inspects the IU Header in the ACW when it has been notified by the HBA that an I/O operation has completed and has verified that the ACW is in ACW State 2.

Firmware also controls whether the last word of the IU header, which in the present embodiment is always at 16 Meg Byte Offset 28, 0x00001C, represents data or an IU Header Data Check Word for the IU Header. The HPF-DR Control bit 16 (the Suppress IU Header Data Check) informs the data router hardware if the Data Check Word for IU headers is to be generated or checked. If enabled the data router hardware generates the IU Header Data Check Word, and then replaces the last word of the IU Header from the ACW with the generated Data Check Word, as the IU Header is being sent to the HBA. If enabled the data router hardware checks the Data Check Word on the received HBA IU header and reports the results in the HPF-DR Response Word 254 at bit 22.

Firmware may set up the ACW so that the data router hardware transfers less than 8 words of IU Header information. It does this by adjusting the State, Header Count, Next Expected 16 Meg Byte Offset and the initial 16 Meg Byte Offset used by the PCIe HBA such that the last IU Header word to be transmitted or received is at the 16 Meg Byte Offset of 28, 0x00001C and the first byte of payload (if any) is at a 16 Meg Byte Offset of 32, 0x000020. The IU Header is always an integral number of words.

Some of the fields in the ACWs described above are set up by the channel microprocessor based on information derived from the receipt of an I/O instruction. Exemplary fields include the ACW State field, the Response Word field, the HPF-DR Control field, the host memory or TIDA memory address field, the Header Count, the "Next Expected 16 Meg Byte Offset field, the D field, the CTL field, the Validation field, the TIDAL Work Area Address field, the Data Check Word Seed field, and the IU header field. The other fields in the ACW are control fields used by the HPF-DR hardware in executing the I/O operation and for presenting ending status information back to Firmware after the I/O operation has completed.

The systems and methods described herein provide mechanisms for checking data processed by the data router 160 for errors. For example, the data router 160 checks a variety of reference points whenever a HBA 154 references the host memory. In one example, the data router 160 checks that an ACW address location in the ACW Index field 176 of an HBA address field 172 is within the memory area bounded by the ACW Origin register 214 and the ACW Limit Register 216.

In another example, the data router 160 checks that the HBA 154 is using the correct ACW for a HBA request by checking that the CTL field and Validation field in the HBA address field 172 match the CTL field and Validation field in the ACW referenced by the HBA request. If these fields do not compare then the channel 128 will end the I/O operation with a Channel Control Check. The data router 160 also checks that the Offset field in the address field 172 (e.g., the low order 24 bits of the HBA address) is equal to the Next Expected 16 Meg Byte Offset in the fetched ACW.

Typically, the IUs include customer data, such as from an enterprise network. The integrity of customer data carried within the one or more IUs is protected by using a data check word, based on a cyclic redundancy check (CRC), such as a 32-bit CRC, contained in the last frame of an IU. The last frame may be classified as an ending IU within each data transfer. The CRC is in addition to the standard FC CRC used to verify the integrity of each individual FC frame. As such, the CRC in the IU has the capability of detecting missing or out of sequence frames/IUs.

The data router 160 also includes the ability to generate or check data check words (e.g., LRC, CRC) that facilitates the data router 160 to detect if data being transferred has been corrupted.

For example, as the data router gathers data from the host memory to be sent to the HBA 154, such as a TCCB 148 or output data, the data router generates a data check word 192 using the Data Check Word seed in the Transport Command ACW and using the TCCB data, and inserting the data check word in the Transport Command IU (e.g., at two words from the end of the IU). The Data Check Word Seed in the Transport Command ACW is pre-calculated by Firmware with the Transport Command IU header and the Length fields. This allows the data check word to cover the entire Transport Command IU including the length fields that follow the data check word in the transmitted IU.

The data router 160 also generates a Data Check Word that checks the entire Transport Write Data IU during transmission across the channel path. This Data Check Word is generated starting with the Data Check Word seed in the Transport Write ACW, and as the Data is being fetched from the host memory, a new Data Check Word is calculated with the fetched data. When all of the data is fetched and transmitted then the resultant Data Check Word is appended and aligned with pad bytes to a word boundary, such as the last 4 bytes of data sent to the HBA. A TIDAW word may have an insert Pad and Data Check Word flag bit set to a one which will cause the data router hardware to insert an intermediate Data Check Word in the Transport write data IU. The control unit will compare the received Data Check Word(s) with its own calculated Data Check Word(s) to verify that the received data IU is valid. For fetches from host memory, the calculated Data Check Word is always inserted and transmitted, after pad bytes on a word boundary, when the TIDAW count decrements to zero and the TIDAW insert Data Check Word Flag bit is set to a one.

The data router 160 may also generate a Data Check Word that checks the Transport Read Data IU that was transmitted across the channel path. The Data Check Word is calculated starting with the Data Check Word seed in the Transport Read ACW and then, as the input data is being stored in the host memory, an updated Data Check Word is calculated with the read data. When all of the data has been received and stored into the host memory, the resultant calculated Data Check Word is compared to the received Data Check Word from the device. The calculated Data Check Word comparing with the received Data Check Word verifies that the received data IU is valid. If the two fields do not compare then the I/O operation is terminated with an Interface Control Check. For example, at the end of receiving a data IU, if the 'Data Check Word Enable' bit 3 is set to a one, and if the expected Data Check Word does not match the received Data Check Word then the data router hardware will set 'Data Check Word mismatch' bit 17 to a one.

The data router hardware also calculates the Data Check Word that checks the Transport Status IU data received from the Link. The Data Check Word is calculated starting with the Data Check Word seed in the Transport Status ACW and as the Transport Status IU data is being stored in host memory the new Data Check Word is calculated. When all of the data for the IU has been received and stored into host memory the resultant calculated Data Check Word is compared to the received Data Check Word from the device. The calculated Data Check Word comparing with the received Data Check Word verifies that the received data IU is valid. If the two fields do not compare the I/O operation is terminated with an Interface Control Check.

The ACW includes the data check word seed value. A Data Check Word Seed field 286 is used by the Firmware to write the initial Data Check Word Seed value in this word. This word is used as the starting seed for the Data Check Word computations both at the beginning of the data transfer for this ACW on reads and writes, and also for 're-seeding' following the processing of the 'Insert Data Check Word' TIDAW flag in a TIDAW when that TIDAW count transitions to zero for writes. For the Transport Command ACW, Firmware takes the original seed for the Transport Command IU and calculates a new value for the Transport Command IU ACW seed by updating the starting Data Check Word seed for the Transport Command IU with the IU Header and the Write and or Read length field(s) that are at the end of the Transport IU. Thus the Transport Command IU Data Check Word covers the entire Transport Command IU even though the data router hardware takes the Seed from the ACW, and only calculates the Data Check Word on the Transport Command IU data portion of the IU. The data router hardware then inserts the Data Check Word into the IU and then transmits the Write or the Read length field or if the I/O operation transfers data in both directions then both the Write and Read length fields are transmitted.

As described herein, the host command may be larger in size than the request stream supported by the host 102. For example, the request stream of the host 102 may be limited by specifications of the port, such as N_Port, that receives the host request from the channel 128. For example, as described earlier, each host request can be as large as 2 k bytes, and the host 102 may be limited to a 256-byte request stream, or any other. It is understood that the above dimensions of the host request and the request stream of the host are specific examples, and that other embodiments of the technical solutions described herein may use different dimensions. The embodiments described herein shall continue to use the above dimensions for explanation purpose.

Figure 10:
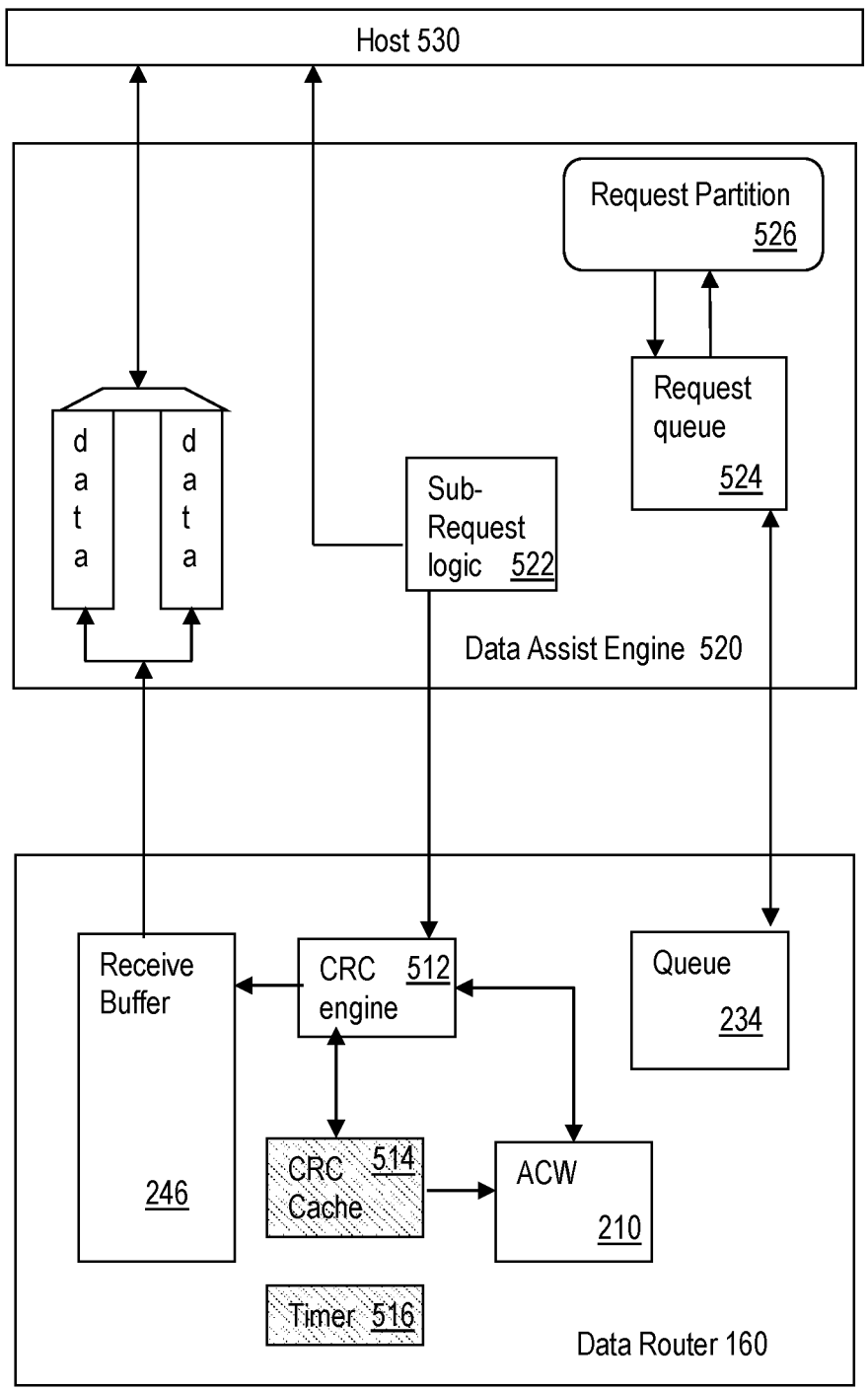
FIG. 10 illustrates components of a data router and a data assist engine.

FIG. 10 illustrates a data assist engine 520 that includes a request partition engine 526, a request queue 524, and a sub-request logic 522. The data assist engine may be part of the HBA 154 of the host 102, and/or the HBA 156 of the CU 118 and devices 116. FIG. 10 further illustrates a CRC engine 512 of the data router 160. The CRC engine computes the data check word for the IU as described earlier, based on the seed value from the ACW 210. In addition, the data router 160 includes a CRC cache 514 and a timer 516 that facilitate overcoming the technical problem of additional memory accesses to maintain the seed value in the ACW 210, which is stored in the memory 132.

In the above example where the host request stream is limited to 256 bytes and the host request is 2 k bytes (or more), the sub request logic 526 splits the host request into 256-byte chunks. As described earlier, to ensure valid computation of the data check word, the CRC engine 512 keeps the data check word seed field 286 of the ACW 210, which is stored in the memory 132, up to date after each transaction. Thus, in the above example, after every 256-byte chunk of data, the data flow incurs a penalty of a memory read/write access, which causes inefficiencies and slow speed.

Figure 11:
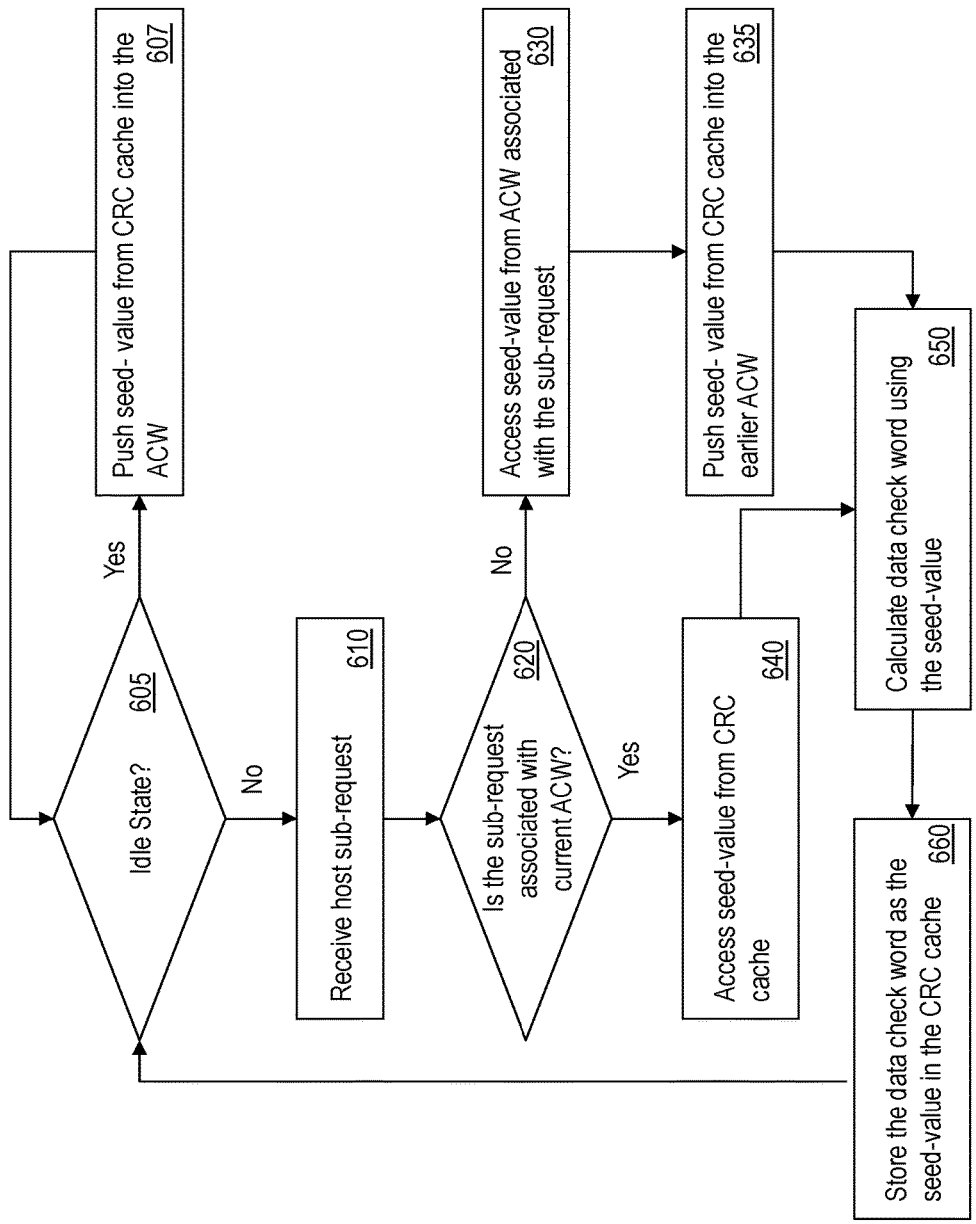
FIG. 11 illustrates a flowchart of an example method for computing data check word for a host request that is split into multiple sub-requests.

FIG. 11 illustrates a flowchart of an example method for computing data check word for a host request that is split into multiple sub-requests. The method ensures that the data check word for the host request is computed using the common seed-value. The description below uses the 256-bytes sub-request as an example for explanation purposes only. In one or more examples, the sub request logic 522 transmits the 2 k host request in form of multiple sub-requests, which are 256-byte each. The data router 160 receives the sub-request, as shown at 610. Alternatively or in addition, the data router 160 accesses the sub-requests that are stored in the Store Array Queue 228.

The data router 160 checks if the 256-byte sub-request is part of the same ACW 210 as a most recent 256-byte host request, as shown at 620. In one or more examples, the data router 160 determines if the sub-request is part of the same ACW 210 based on a request ID (RID). The RID is given by the data router 234 to the data assist engine 524 on the initial host command request (the 2 k request). The data assist engine 524 uses this RID in each 256 byte host request until the entire host command request (2 k request) transaction is complete. The RID ensures that the request is part of the same ACW.

If so, the CRC engine 512 gets data check word seed from the CRC Cache 514, as shown at 640, and else accesses the seed-value from the ACW 210 in the memory 132, as shown at 630. The data router 160 identifies the ACW associated with the sub-request using the ACW index as described herein (See FIG. 7). In either case, the CRC engine 512 calculates the data check word, such as the CRC, for the chunk using the seed-value, as shown at 650. The CRC engine 512 stores the computed data check word in the CRC cache 514, as shown at 660. In case the received sub-request is associated with a different ACW, the CRC engine 512 pushes the seed-value from the CRC cache 514 into the ACW 210, as shown at 635.

The CRC engine 512 uses the CRC cache 514 for the seed value until the data assist engine 520 stops sending further requests, or if a request from the sub-request logic 522 corresponds to a different ACW. In addition, the CRC engine 512 pushes the seed value from the CRC cache 514 into the ACW 210 when idle, as shown at 607. The CRC engine 512 determines an idle state using the timer 516, as shown at 605. In an example, after completing a data check word calculation, the CRC engine 512 checks the value of the timer 516, and if no further host request (or sub-request) is received for a predetermined amount of time, the CRC engine 512 deems that an idle state has started. In response to entering the idle state, the CRC engine 512 pushes the seed value from the CRC cache into the ACW 210 in the field 286, as shown at 607. Alternatively or in addition, the timer 516 raises an interrupt for the CRC engine 512 in response to the predetermined amount of time being elapsed, wherein the interrupt is indicative of the idle state.

Alternatively or in addition, the CRC engine 512 determines an idle state corresponding to the specific ACW 210, as shown at 605. For example, the CRC engine 512, using the timer 516 monitors the amount of time since a previous host request (or sub-request) corresponding to the ACW 210. If the predetermined amount of time is elapsed since receipt of a request pertaining to the ACW 210, the CRC engine deems that an idle state corresponding to the ACW 210 has started. Accordingly, in response, the CRC engine stores the seed value from the CRC cache 514 into field 286 of the ACW 210.

The CRC cache 514 has relatively lower latency than the memory 132 in which the ACW 210 is stored. Accordingly, accessing the data check seed value from the CRC cache facilitates the data check word computation to be faster compared to accessing from the memory 132. Thus, the transmission of the data occurs sooner, in turn improving the overall I/O process.

Accordingly, the technical solutions described herein facilitate the data router to compute the data check word on the fly as the data streams through the data router 160 to the data assist engine 520.

Thus, the technical solutions described herein facilitate a system and method for checking an HBA while the HBA directly addresses the host memory during an I/O operation. For example, the ACW facilitates the data router to provide data checking for a device having direct access the host memory, as well as the ability to isolate a failed HBA from the host computer. For example, the address control structures and associated ACWs include validation and offset fields that are checked by the data router when an HBA data transfer request is received.

In one or more examples, the technical solutions facilitate inserting or removing headers to or from memory requests between the HBA and the host memory. Conventionally, the channel can receive and store header information from an HBA read request in the local channel memory, or generate a header and append the header to output data in response to an HBA write request. In the one or more examples facilitated by the technical solutions described herein, the channel (via the data router hardware) stores a read request header in local channel memory while input data is directly stored in the host memory. Further, the channel, by using the technical solutions described herein, generates and appends a header to output data that has been directly accessed from the host memory via a HBA write request. For example, a read ACW is provided for HBA read requests and a write ACW is provided for HBA write requests. The read ACW is used to store header information that is received with input data, and the write ACW is used to store header information used to generate a header and append the header to output data.

Further, the technical solutions described herein facilitate inserting check fields into output data and checking input data during direct data transfers between the HBA and the host memory during an I/O operation to detect whether transferred data has been corrupted. Conventionally, for write (output) operations, the channel sets up data check words with customer output data that was stored in the local channel memory. For read (input) operations, the channel stores the input data and data check words in local channel memory and performs a check of the data. Examples of data check words include cyclical redundancy check (CRC) words, longitudinal redundancy check (LRC) words, and Check Sum data. In the embodiments described herein, the channel data router hardware uses an ACW to insert and/or check data check words (in this case, data check words are stored or generated from the local channel memory while the customer data, i.e., input or output data, is directly transferred between the host memory and the HBA). Further yet, the data router hardware computes the data check words by caching a data check seed value associated with an ACW, and thus reducing memory accesses. The data router hardware updates the memory with the seed value in response to an idle state, or upon a predetermined duration being elapsed.

The technical solutions described herein address the technical problem of memory accesses slowing down data check word computation by performing a predictive caching for CRC snooping performance in high performance FICON, as described herein. The technical solutions described herein incorporate a timer and a CRC cache for host requests that belong to a common Access Control Word (ACW) to reduce the memory access penalty. The CRC cache is used to remove memory read/write access penalty and the smart timer is used to keep the memory data up to date periodically instead of after every transaction, such as the 256-byte transaction in the above example.

As such the technical solutions are rooted in and/or tied to computer technology in order to overcome a problem specifically arising in the realm of computers, specifically I/O processing.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for computing data check word for a host request for performing an input/output (I/O) processing operation at a host computer system configured for communication with a control unit, the method comprising:

obtaining information relating to a first I/O operation at a channel subsystem in the host computer system, the channel subsystem including at least one channel having a channel processor and a local channel memory;

accessing an address control word (ACW) corresponding to the first I/O operation, the ACW specifying one or more host memory locations for transfer of data between the host computer system and the control unit, the ACW being stored in the local channel memory, the ACW including a first data check seed-value;

computing a first data check word based on the first data check seed-value from the ACW;

obtaining information relating to a second I/O operation at the channel subsystem; and in response to the second I/O operation corresponding to said ACW that is corresponding to the first I/O operation, computing a second data check word based on a second data check seed-value from a cache memory.

2. The computer implemented method of claim 1, wherein, in response to the second I/O operation not corresponding to the ACW of the first I/O operation, computing the second data check word based on the second data check seed-value from a second ACW corresponding to the second I/O operation.

3. The computer implemented method of claim 1, further comprising: storing the first data check word as the second data check seed-value in the cache memory.

4. The computer implemented method of claim 3, further comprising: in response to the second I/O operation not corresponding to the ACW of the first I/O operation, storing the second data check seed-value from the cache memory in said ACW.

5. The computer implemented method of claim 3, further comprising: in response to entering an idle state, storing the second data check seed-value from the cache memory in said ACW.

6. The computer implemented method of claim 5, wherein the idle state is entered in response to a predetermined duration being elapsed without another I/O operation since completing the second I/O operation.

7. The computer implemented method of claim 1, wherein the data check word is one from a group consisting of a cyclical redundancy check (CRC) word, a longitudinal redundancy check (LRC) word, and a checksum word.

8. The computer implemented method of claim 1, wherein the cache memory has a lower latency than the local channel memory.

9. The computer implemented method of claim 1, wherein the first I/O operation and the second I/O operation are part of a common host request.

10. A system for computing data check word for a host request for performing an input/output (I/O) processing operation at a host computer system configured for communication with a control unit, the system comprising:

a memory;
a cache memory that has lower latency than the memory;
a timer; and
a data router hardware coupled to the memory, the cache memory, and the timer, and the data router configured to perform a method comprising:

obtaining information relating to a first I/O operation at a channel subsystem in the host computer system, the channel subsystem including at least one channel having a channel processor and a local channel memory;

accessing an address control word (ACW) corresponding to the first I/O operation, the ACW specifying one or more host memory locations for transfer of data between the host computer system and the control unit, the ACW being stored in the local channel memory, the ACW including a first data check seed-value;

computing a first data check word based on the first data check seed-value from the ACW;

obtaining information relating to a second I/O operation at the channel subsystem; and in response to the second I/O operation corresponding to said ACW that is corresponding to the first I/O operation, computing a second data check word based on a second data check seed-value from a cache memory.

11. The system of claim 10, wherein, in response to the second I/O operation not corresponding to the ACW of the first I/O operation, computing the second data check word based on the second data check seed-value from a second ACW corresponding to the second I/O operation.

12. The system of claim 10, wherein the method further comprises storing the first data check word as the second data check seed-value in the cache memory.

13. The system of claim 12, wherein the method further comprises: in response to the second I/O operation not corresponding to the ACW of the first I/O operation, storing the second data check seed-value from the cache memory in said ACW.

14. The system of claim 12, wherein the method further comprises: in response to entering an idle state, storing the second data check seed-value from the cache memory in said ACW.

15. The system of claim 14, wherein the idle state is entered in response to a predetermined duration being elapsed without another I/O operation since completing the second I/O operation.

16. The system of claim 10, wherein the data check word is one from a group consisting of a cyclical redundancy check (CRC) word, a longitudinal redundancy check (LRC) word, and a checksum word.

17. A computer program product for a host request for performing an input/output (I/O) processing operation at a host computer system configured for communication with a control unit, the computer program product comprising a computer readable storage medium, the computer readable storage medium comprising computer executable instructions, wherein the computer readable storage medium comprises instructions to perform a method comprising:

obtaining information relating to a first I/O operation at a channel subsystem in the host computer system, the channel subsystem including at least one channel having a channel processor and a local channel memory;

accessing an address control word (ACW) corresponding to the first I/O operation, the ACW specifying one or more host memory locations for transfer of data between the host computer system and the control unit, the ACW being stored in the local channel memory, the ACW including a first data check seed-value;

computing a first data check word based on the first data check seed-value from the ACW;

obtaining information relating to a second I/O operation at the channel subsystem; and in response to the second I/O operation corresponding to said ACW that is corresponding to the first I/O operation, computing a second data check word based on a second data check seed-value from a cache memory.

18. The computer program product of claim 17, wherein, in response to the second I/O operation not corresponding to the ACW of the first I/O operation, computing the second data check word based on the second data check seed-value from a second ACW corresponding to the second I/O operation.

19. The computer program product of claim 17, wherein the method further comprises: storing the first data check word as the second data check seed-value in the cache memory.

20. The computer program product of claim 18, wherein the method further comprises: in response to the second I/O operation not corresponding to the ACW of the first I/O operation, storing the second data check seed-value from the cache memory in said ACW.

* * * * *